United States Patent
Ogawa et al.

(10) Patent No.: US 7,520,514 B2
(45) Date of Patent: Apr. 21, 2009

(54) BODY FRAME STRUCTURE

(75) Inventors: Tsutomu Ogawa, Saitama (JP);
Kunihiko Kimura, Saitama (JP);
Fumiaki Fukuchi, Saitama (JP);
Shuichi Ono, Saitama (JP); Shuji Otake, Saitama (JP); Yasunori Oku, Saitama (JP); Hideki Koga, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 288 days.

(21) Appl. No.: 10/588,002

(22) PCT Filed: Mar. 29, 2005

(86) PCT No.: PCT/JP2005/006562

§ 371 (c)(1),
(2), (4) Date: Aug. 1, 2006

(87) PCT Pub. No.: WO2005/095181

PCT Pub. Date: Oct. 13, 2005

(65) Prior Publication Data

US 2007/0169982 A1    Jul. 26, 2007

(30) Foreign Application Priority Data

Mar. 31, 2004  (JP) .............................. 2004-103569
Mar. 31, 2004  (JP) .............................. 2004-103961
Mar. 31, 2004  (JP) .............................. 2004-104177

(51) Int. Cl.
*B62D 21/11* (2006.01)

(52) U.S. Cl. .............................. 280/124.109; 280/785; 180/312

(58) Field of Classification Search .......... 280/124.109, 280/785, 781; 296/205, 204; 180/311, 312
See application file for complete search history.

(56) References Cited

U.S. PATENT DOCUMENTS 5,104,142 A * 4/1992 Tsubota et al. ......... 280/86.757

(Continued)

FOREIGN PATENT DOCUMENTS

DE    198 22 731 A1    11/1999

(Continued)

*Primary Examiner*—Ruth Ilan
*Assistant Examiner*—Drew J. Brown
(74) *Attorney, Agent, or Firm*—Arent Fox LLP

(57) ABSTRACT

A front subframe 42 is formed of an aluminum alloy into a frame that is formed substantially into a shape of parallel crosses or into a rectangular shape and is made up of left and right front joint portions 64, 64 and left and right rear joint portions 71, 71 which are disposed at corners of the frame that is formed substantially into the shape of parallel crosses or the rectangular shape, and left and right longitudinal members 61, 61, and front and rear cross members 62, 67 which connect the joint portions 64, 64, 71, 71 together. The left and right front joint portions 64, 64 and the left and right rear joint portions 71, 71 are formed of an aluminum alloy die-cast product, whereas the left and right longitudinal members 61, 61 are formed of an aluminum alloy wrought product. In addition, connecting locations 76 . . . of a camber angle adjusting mechanism 157 are formed of an aluminum alloy die-cast product. Additionally, a rear cross member compound 63 is formed of an aluminum alloy die-cast product.

10 Claims, 20 Drawing Sheets

U.S. PATENT DOCUMENTS

| | | | | |
|---|---|---|---|---|
| 5,556,133 | A * | 9/1996 | Oku et al. | 280/781 |
| 6,109,654 | A * | 8/2000 | Yamamoto et al. | 280/784 |
| 6,234,568 | B1 * | 5/2001 | Aoki | 296/203.04 |
| 6,494,472 | B2 * | 12/2002 | Suzuki | 280/124.109 |
| 6,623,020 | B1 * | 9/2003 | Satou | 280/124.109 |
| 6,679,523 | B2 * | 1/2004 | Yamamoto et al. | 280/785 |
| 6,880,663 | B2 * | 4/2005 | Fujiki et al. | 180/232 |
| 6,923,474 | B2 * | 8/2005 | Frasch et al. | 280/784 |
| 6,929,272 | B2 * | 8/2005 | Matsumoto et al. | 280/124.109 |
| 6,979,023 | B2 * | 12/2005 | Mikasa et al. | 280/781 |
| 2004/0108677 | A1 * | 6/2004 | Sekiguchi | 280/124.109 |
| 2006/0284449 | A1 * | 12/2006 | Miyahara | 296/204 |
| 2007/0024044 | A1 * | 2/2007 | Ogawa et al. | 280/788 |

FOREIGN PATENT DOCUMENTS

| | | |
|---|---|---|
| DE | 199 23 693 A1 | 11/2000 |
| DE | 102 26 526 A1 | 8/2003 |
| EP | 0 306 046 A2 | 3/1989 |
| EP | 0 306 046 A3 | 3/1989 |
| EP | 1 362 767 A2 | 11/2003 |
| EP | 1 362 767 A3 | 3/2004 |
| JP | 1-102074 U | 7/1989 |
| JP | 1-112104 U | 7/1989 |
| JP | 03 281407 A | 12/1991 |
| JP | 2690544 B2 | 8/1997 |
| JP | 10-100635 A | 4/1998 |
| JP | 11-208503 A | 8/1999 |
| JP | 2000-177621 A | 6/2000 |
| JP | 2001-171326 A | 6/2001 |
| JP | 3272270 B2 | 1/2002 |
| JP | 2002-137617 A | 5/2002 |
| JP | 2002-200988 A | 7/2002 |

* cited by examiner

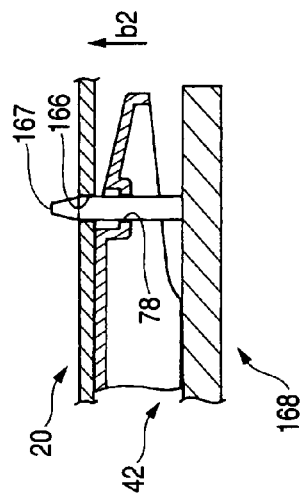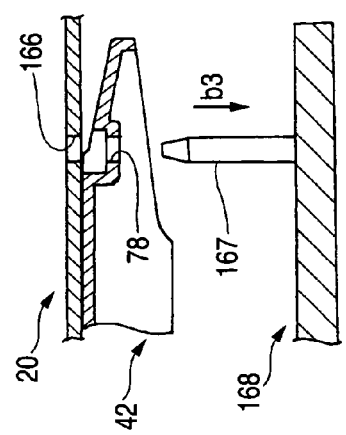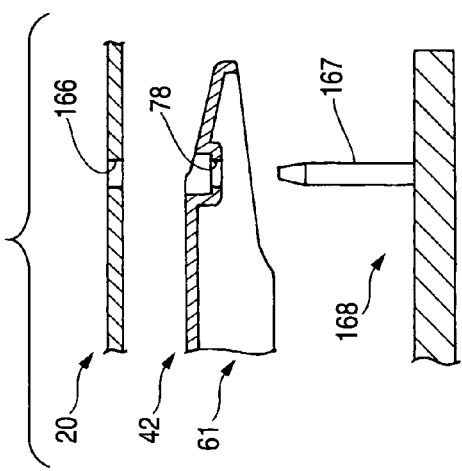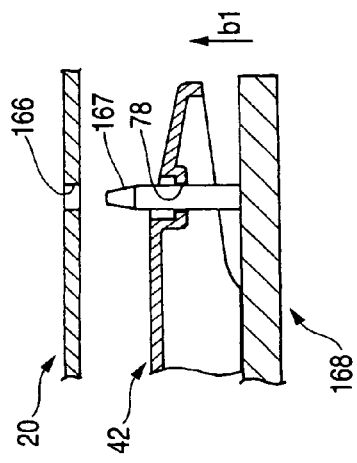

BODY FRAME STRUCTURE

CROSS-REFERENCE TO RELATED APPLICATION

This application is a National Stage entry of International Application No. PCT/JP2005/006562, filed Mar. 29, 2005, the entire specification claims and drawings of which are incorporated herewith by reference.

TECHNICAL FIELD

The present invention relates to a body frame structure having a front subframe on which drive train parts, steering system parts or suspension system parts are installed and which is attached to a body side.

BACKGROUND ART

As body frame structures, those are now in practical use which have a subframe which supports drive train parts including a power source, steering system parts such as a steering gear box and suspension system parts such as suspensions, and camber and caster angles adjusting mechanisms.

In those body frame structures which are now in practical use, it has been practically sufficient that a front subframe is formed substantially in parallel crosses or into a rectangle in such a manner that drive train parts, steering system parts or suspension system parts can be installed thereon.

As these body frame structures, those are known which adopt a front subframe which is made up of a die-cast product using an aluminum alloy as a material and a front subframe which is made up of an aluminum allow extruded product (for example, refer to JP-A-2002-137617 (page 4, FIG. 1), JP-A-2000-177621 (Page 5, FIG. 2)).

FIG. 20 is a drawing which explains a basic configuration of a conventional body frame structure having a subframe made of an aluminum die-cast product, and a body frame structure 300 is made up of a subframe 301 that is attached to the body side, an upper arm 302 which extends outwards from an upper portion of the subframe 301 in such a manner as to freely swing, lower arms 303 which extend outwards from lower portions of the subframe 301 in such a manner as to freely swing, and an axle support member (a knuckle) 307 which supports an axle (not shown) by being movably attached to distal ends of the upper arm 302 and the lower arms 303, 303 via an upper ball joint 304 and lower ball joints 305, 305, respectively, and is formed integrally through die casting an aluminum alloy, wherein the subframe 301 is formed in parallel crosses.

FIG. 21 is a drawing which explains a basic configuration of a conventional body frame having a subframe which is made of an aluminum alloy extruded product, and a body frame structure 310 is a subframe structure (a front subframe) 311 which supports drive train parts including a power source and suspension system parts such as suspensions.

The subframe 311 is made up of a front frame portion 312, left and right front corner portions 313, 313 which are connected to left and right end portions of the front frame portion 312, a left frame portion 314 which extends rearwards from the left front corner portion 313, a right frame portion 314 which extends rearwards from the right front corner portion 313, left and right rear corner portions 315, 315 which are connected to distal ends of the left and right frame portions 314, 314 and a rear frame portion 316 which is connected to the left and right rear corner portions 315, 315, respectively.

In addition, the subframe 311 utilizes aluminum alloy extruded products at the front frame portion 312 and the rear frame portion 316, the left and right frame portions 314, 314, the left and right front corner portions 313, 313 and the left and right rear corner portions and is formed substantially into a rectangular shape.

In the body frame structure 300 shown in FIG. 20, however, since the subframe 301 is such as to be formed integrally by die casting the aluminum alloy, the rigidity of the whole frame is high, and for example, in order to increase the load transmission performance which disperses and absorbs an excessive load such as an impact which is applied to the subframe 301, when such a thing occurs, and the shape maintaining performance which maintains an initial shape of the subframe 301, the shape of the subframe 301 needs to be complex, and this leads to a problem that such a complex shape makes it difficult to increase the productivity under mass production.

In addition, in the body frame structure 310 shown in FIG. 21, since the subframe 311 is made up of the aluminum alloy extruded product, the rigidity of the whole frame is low, and in order to increase the rigidity at, for example, a fixing portion of such as a steering gear box (not shown) where a large steering reaction is generated, a fixing portion such as a fixing portion of a suspension where there is a large input and a connecting portion to the body where road surface vibrations are inputted, the thickness of those portions needs to be increased, leading to a drawback that the increase in thickness calls for an increase in vehicle weight.

In addition, in the body frame structure 310, since the subframe (the front subframe) is divided into the front frame portion 312 and the rear frame portion 316, the left and right frame portions 314, 314, the left and right front corner portions 313, 313 and the left and right rear corner portions 315, 315, there occur assembling errors when these members are assembled, leading to a problem that the body frame structure 310 is not suitable for locations where dimensional accuracy is required.

Namely, a body frame structure is desired which can increase the load transmission performance and the shape maintaining performance while realizing the suppression of increase in vehicle weight.

In addition, a body frame structure is desired which can secure the rigidity of the frame while realizing the suppression of increase in vehicle weight.

Furthermore, a body frame structure is desired which can not only suppress the increase in vehicle weight while increasing the rigidity of the frame but also increase the accuracy at locations where dimensional accuracy is required.

DISCLOSURE OF THE INVENTION

A problem that the invention is to solve is that by solving the problem that the rigidity is high over the entirety of the frame, the invention provides a body frame structure which can increase the load transmission performance and the shape maintaining performance, and provides a body frame structure which can suppress the increase in vehicle weight by solving the problem that requires the increase in thickness so as to increase the rigidity of the frame.

In addition, another problem that the invention is to solve is that by solving the problem that the rigidity of the frame is low, the invention provides a body frame structure which can not only increase the rigidity of the frame but also realize the suppression of increase in vehicle weight.

Furthermore, a further problem that the invention is to solve is that by solving the problem that the rigidity of the frame is low, the invention provides a body frame structure which can not only realize the suppression of increase in vehicle weight while increasing the frame rigidity but also increase the accuracy at the locations where dimensional accuracy is required by solving the problem that the assembling errors are produced.

According to a first aspect of the invention, there is provided a body frame structure including a front subframe that supports drive train parts including a power supply, steering system parts including a steering gear box and suspension system parts including a front suspension or an adjusting mechanism for adjusting a caster angle and which is supported on a body side, the body frame structure being characterized in that the front subframe is a frame that is formed substantially into a shape of parallel crosses or into a rectangular shape and which comprises a front cross member, left and right front joint portions which are connected to left and right end portions of the front cross member, a left longitudinal member that extends rearwards from the left front joint portion, a right longitudinal member that extends rearwards from the right front joint portion, left and right rear joint portions which connect to distal ends of the left and right longitudinal members, respectively, and a rear cross member that connects to the left and right rear joint portions, and in that the left and right front joint portions and the left and right rear joint portions are made of an aluminum alloy die-cast product, and the left and right longitudinal members are made of an aluminum alloy wrought product.

For example, it is preferable to increase the load transmission performance and the shape maintaining performance of the front subframe since a load resulting from an inputted impact can be dispersed, so that the load so dispersed can be absorbed, and it will be preferable in case the rigidity can be increased without increasing the thickness of sheets metal since an increase in vehicle weight can be suppressed.

To make this happen, the front subframe is made up of the left and right front joint portions and the left and right rear joint portions which are disposed at corners of the shape which is formed substantially into parallel crosses or rectangle, and the left and right longitudinal members and the front and rear cross members which connect the joint portions together. In addition, the left and right front joint portions and the left and right rear joint portions are formed of the aluminum alloy die-cast product, while the left and right longitudinal members are formed of the aluminum alloy wrought product.

Namely, the load transmission performance and the shape maintaining performance of the front subframe are increased, and the suppression of increase in vehicle weight is realized by forming the left and right front joint potions and the left and right rear joint portions of the aluminum alloy die-cast product and forming the left and right longitudinal members of the aluminum alloy wrought product.

According to a second aspect of the invention, there is provided a body frame structure, characterized in that the left and right longitudinal members are divided into left and right front divided portions and left and right rear divided portions and the left and right rear divided portions and the left and right rear joint portions are made integrally of an aluminum alloy die-cast product, and in that a left reinforcement member that is formed of an aluminum alloy wrought product is extended from the left front divided portion to the left rear joint portion so that the left reinforcement member is fixed to the left rear divided portion and the left rear joint portion, while a right reinforcement member that is formed of an aluminum alloy wrought product is extended from the right front divided portion to the right rear joint portion so that the right reinforcement member is fixed to the right rear divided portion and the right rear joint portion.

By forming the left and right divided portions and the left and right rear joint portions and the rear cross member integrally of the aluminum alloy die-cast product, for example, when the steering gear box is fixed to the rear cross member, the steering gear box is strongly and rigidly supported on the rear cross member.

In addition, by extending the left reinforcement member that is formed of the aluminum alloy wrought product from the left front divided portion to the left rear joint portion so that the left reinforcement is fixed to the left rear divided portion and the left rear joint portion and extending the right reinforcement member that is formed of the aluminum alloy wrought product from the right front divided portion to the right rear joint portion so that the right reinforcement member is fixed to the right rear divided portion and the right rear joint portion, the load transmission performance and the shape maintaining performance can further be increased.

According to a third aspect of the invention, there is provided a body frame structure, characterized in that a stabilizer adapted to suppress the inclination of a body is fixed to the left rear joint portion and the left reinforcement member and/or the right rear joint portion and the right reinforcement member, whereby the stabilizer is made to be fixed in such a manner as to straddle the die-cast product and the wrought product.

Even in the event that an excessive load is applied to the stabilizer, the stabilizer can still be held to the front subframe by fixing the stabilizer in such a manner as to straddle between the die-cast product which has a high rigidity and the wrought product which has extensibility.

According to a fourth aspect of the invention, there is provided a body frame structure, characterized in that the rear cross member is formed of an aluminum alloy die-cast product and the steering gear box is supported on the rear cross member.

For example, it is preferable in case the rigidity can be increased without increasing the thickness of the sheets metal, since the increase in weight can be suppressed.

To make this happen, by forming the rear cross member of the front subframe of the aluminum alloy die-cast product and supporting the steering gear box on the rear cross member so formed, the suppression of increase in weight can be realized while strongly and rigidly supporting the steering gear box.

According to a fifth aspect of the invention, there is provided a body frame structure, characterized in that the left and right rear joint portions and the rear cross member are formed integrally of an aluminum alloy die-cast product, and the front cross member and the left and right longitudinal members are formed of an aluminum alloy extruded product.

By forming the left and right rear joint portions and the rear cross member integrally of the aluminum alloy die-cast product, forming the left and right front joint portions of the aluminum alloy die-cast product and forming the front cross member and the left and right longitudinal members of the aluminum alloy extruded product, not only can the steering gear box be supported strongly and rigidly but also, even in the event that an excessive impact is inputted into the front subframe, the impact so inputted can be absorbed by the front cross member and the left and right longitudinal members which are formed of the aluminum alloy extruded product.

According to a sixth aspect of the invention, there is provided a body frame structure, characterized in that a location to which the adjusting mechanism is joined is formed of an aluminum alloy die-cast product.

For example, it is preferable in case the rigidity can be increased without increasing the thickness of the sheets metal, since the suppression of increase in weight can be realized.

To make this happen, the location of the front subframe to which the adjusting mechanism is joined is made of the aluminum alloy die-cast product.

Namely, the front subframe is formed into a frame which is formed substantially into parallel crosses or into rectangle by combining the aluminum alloy die-cast product with the extruded product and the location to which the adjusting mechanism is joined is formed of the aluminum alloy die-cast product, whereby the front subframe is made light in weight compared with, for example, a case where the thickness of the extruded product is increased so as to increase the rigidity of the frame.

In addition, the die-cast product requires less mechanical work after casting. Consequently, the assembling accuracy of the adjusting mechanism can be increased by forming the location to which the adjusting mechanism is joined of the aluminum die-cast product.

According to a seventh aspect of the invention, there is provided a body frame structure, characterized in that the front suspension is supported at the location to which the adjusting mechanism is joined, and a positioning mechanism adapted to position the front subframe on the body side is formed integrally with the location to which the adjusting mechanism is joined.

Namely, the front suspension is supported on the location to which the adjusting mechanism is joined, and the positioning mechanism adapted to position the front subframe on the body side is formed integrally with the location to which the adjusting mechanism is joined, whereby the accuracy at which the front suspension is attached to the body side can be increased.

According to an eighth aspect of the invention, there is provided a body frame structure including a front subframe that supports drive train parts including a power source, steering system parts including a steering gear box and suspension system parts including a front suspension and which is supported on a body side, the body frame structure being characterized in that the front subframe is a frame that is formed substantially into a shape of parallel crosses or into a rectangular shape and which comprises a front cross member, left and right front joint portions which are connected to left and right end portions of the front cross member, a left longitudinal member that extends rearwards from the left front joint portion, a right longitudinal member that extends rearwards from the right front joint portion, left and right rear joint portions which connect to distal ends of the left and right longitudinal members, respectively, and a rear cross member that connects to the left and right rear joint portions, and in that the rear cross member is formed of an aluminum alloy die-cast product, and the steering gear box is supported on the rear cross member.

For example, it is preferable in case the rigidity can be increased without increasing the thickness of the sheets metal, since the suppression of increase in weight can be realized.

To make this happen, the front subframe is made into the frame which is formed substantially into the shape of parallel crosses or the rectangular shape and is made to comprise the front cross member, left and right front joint portions which are connected to the left and right end portions of the front cross member, the left longitudinal member that extends rearwards from the left front joint portion, the right longitudinal member that extends rearwards from the right front joint portion, the left and right rear joint portions which connect to the distal ends of the left and right longitudinal members, respectively, and the rear cross member that connects to the left and right rear joint portions, and the rear cross member is formed of the aluminum alloy die-cast product, and the steering gear box is supported on the rear cross member, whereby the suppression of increase in weight can be realized while supporting the steering gear box on the rear cross member.

According to a ninth aspect of the invention, there is provided a body frame structure as set forth in the eighth aspect of the invention, characterized in that the left and right rear joint potions and the rear cross member are formed integrally of an aluminum alloy die-cast, the left and right front joint portions are formed of an aluminum alloy die-cast product, and the front cross member and the left and right longitudinal members are formed of an aluminum alloy extruded product.

The left and right rear joint potions and the rear cross member are formed integrally of the aluminum alloy die-cast, the left and right front joint portions are formed of the aluminum alloy die-cast product, and the front cross member and the left and right longitudinal members are formed of the aluminum alloy extruded product, whereby not only can the steering gear box be supported strongly and rigidly but also, even in the event that an excessive impact is inputted into the front subframe, the impact so inputted can be absorbed by the front cross member and the left and right longitudinal members which are formed of the aluminum alloy extruded product.

According to a tenth aspect of the invention, there is provided a body frame structure including a front subframe that supports drive train parts including a power supply, steering system parts including a steering gear box and suspension system parts including a front suspension and an adjusting mechanism for adjusting a camber angle or caster angle and which is supported on a body side, the body frame structure being characterized in that the front subframe is a frame that is formed substantially in parallel crosses or into a rectangular shape and which comprises a front cross member, left and right front joint portions which are connected to left and right end portions of the front cross member, a left longitudinal member that extends rearwards from the left front joint portion, a right longitudinal member that extends rearwards from the right front joint portion, left and right rear joint portions which connect to distal ends of the left and right longitudinal members, respectively, and a rear cross member that connects to the left and right rear joint portions, and in that a location to which the adjusting mechanism is joined is formed of an aluminum alloy die-cast product.

For example, it is preferable in case the rigidity can be increased without increasing the thickness of the sheets metal, since the suppression of increase in weight can be realized.

To make this happen, the front subframe is made into the frame which is formed substantially into the shape of parallel crosses or the rectangular shape by combining the aluminum alloy die-cast product with the extruded product and is made up of the left and right front joint portions and the left and right rear joint portions which are disposed at the corners of the shape which is formed substantially into parallel crosses or rectangle and the left and right longitudinal members and the front and rear cross members which connect the joint portions together, and the location to which the adjusting mechanism is joined is formed of the aluminum die-cast product.

Namely, the front subframe is made into the frame which is formed substantially into the shape of parallel crosses or the rectangular shape by combining the aluminum alloy die-cast product with the extruded product, and the location to which the adjusting mechanism is joined is formed of the aluminum die-cast product is formed of the aluminum alloy die-cast product, whereby the front subframe is made light in weight compared with a case where the thickness of the extruded product is increased so as to increase the rigidity of the frame.

In addition, the die-cast product requires less mechanical work, and hence by forming the location to which the adjusting mechanism is joined of the die-cast product, the accuracy at which the adjusting mechanism is attached is increased.

According to an eleventh aspect of the invention, there is provided a body frame structure, characterized in that the front suspension is supported at the location to which the adjusting mechanism is joined, and a positioning mechanism adapted to position the front subframe on the body side is formed integrally with the location to which the adjusting mechanism is joined.

Namely, by supporting the front suspension at the location to which the adjusting mechanism is joined and forming the positioning mechanism for positioning the front subframe on the body side integrally with the location to which the adjusting mechanism is joined, the accuracy at which the front suspension is attached to the body side is increased.

According to the first aspect of the invention, since the left and right front joint portions and the left and right rear joint portions are formed of the aluminum alloy die-cast product and the left and right frame portions are formed of the aluminum alloy wrought product, not only can the load transmission performance and the shape maintaining performance of the front subframe be increased but also the suppression of increase in weight can be realized. As a result, there are provided advantages that the increase in riding comfort can be realized, and that the increase in fuel economy can be realized.

According to the second aspect of the invention, since the rear end portions of the left and right longitudinal members, the left and right rear joint portions and the rear cross member are formed integrally of the aluminum alloy die-cast product, for example, when attempting to fix a steering part such as the steering gear box on the rear cross member, the steering gear box can be supported on the same cross member strongly and rigidly. As a result, there is provided an advantage that the manipulating feel of the steering wheel can be increased.

In addition, since the left reinforcement member that is formed of the aluminum alloy wrought product is extended from the left front divided portion to the left rear joint portion so that the left reinforcement is fixed to the left rear divided portion and the left rear joint portion and the right reinforcement member that is formed of the aluminum alloy wrought product is extended from the right front divided portion to the right rear joint portion so that the right reinforcement member is fixed to the right rear divided portion and the right rear joint portion, there is provided an advantage that the load transmission performance and the shape maintaining performance of the front subframe can further be increased.

According to the third aspect of the invention, even in the event that an excessive load is applied to the stabilizer, since the stabilizer is fixed in such a manner as to straddle between the die-cast product which has a high rigidity and the wrought product which has extensibility the stabilizer, the stabilizer can still be held to the front subframe.

According to the fourth and eighth aspects of the invention, the front subframe is made into the frame which is formed substantially into the shape of parallel crosses or the rectangular shape and is made to comprise the front cross member, the left and right front joint portions which are connected to the left and right end portions of the front cross member, the left longitudinal member that extends rearwards from the left front joint portion, the right longitudinal member that extends rearwards from the right front joint portion, the left and right rear joint portions which connect to the distal ends of the left and right longitudinal members, respectively, and the rear cross member that connects to the left and right rear joint portions, the rear cross member is formed of the aluminum alloy die-cast product, and the steering gear box is supported on the rear cross member, whereby the suppression of increase in weight can be realized while supporting the steering gear box on the rear cross member. As a result, there is provided an advantage that the vibration of the steering gear box can be suppressed while suppressing the increase in weight.

According to the fifth and nine aspects of the invention, since the left and right rear joint portions and the rear cross member are formed integrally of the aluminum alloy die-cast product, the left and right front joint portions are formed of the aluminum alloy die-cast product and the front cross member and the left and right longitudinal members are formed of the aluminum alloy extruded product, not only can the steering gear box be supported strongly and rigidly but also, even in the event that an excessive impact is inputted into the front subframe, the impact so inputted can be absorbed by the front cross member and the left and right longitudinal members which are formed of the aluminum alloy extruded product. As a result, there is provided an advantage that the impact that is to be applied to the steering gear box can be suppressed to a minimum limit.

According to the sixth and tenth aspects of the invention, since the front subframe is formed into the frame which is formed substantially into parallel crosses or into rectangle by combining the aluminum alloy die-cast product with the extruded product and the location to which the adjusting mechanism is joined is formed of the aluminum alloy die-cast product, the front subframe is made light in weight compared with, for example, the case where the thickness of the extruded product is increased so as to increase the rigidity of the frame.

As a result, there is provided an advantage that the suppression of increase in weight can be realized while increasing the rigidity of the frame. Furthermore, there is provided another advantage that the deformation of the location to which the adjusting mechanism due to an external force can be reduced.

In addition, by forming the location to which the adjusting mechanism is joined f the aluminum alloy die-cast product, there is provided a further advantage that the accuracy at which the adjusting mechanism is attached can be increased.

According to the seventh and eleventh aspects of the invention, since the front suspension is supported on the location to which the adjusting mechanism is joined and the positioning mechanism adapted to position the front subframe on the body side is formed integrally with the location to which the adjusting mechanism is joined, there is provided an advantage that the accuracy at which the front suspension is attached to the body side can be increased.

Figure 1:
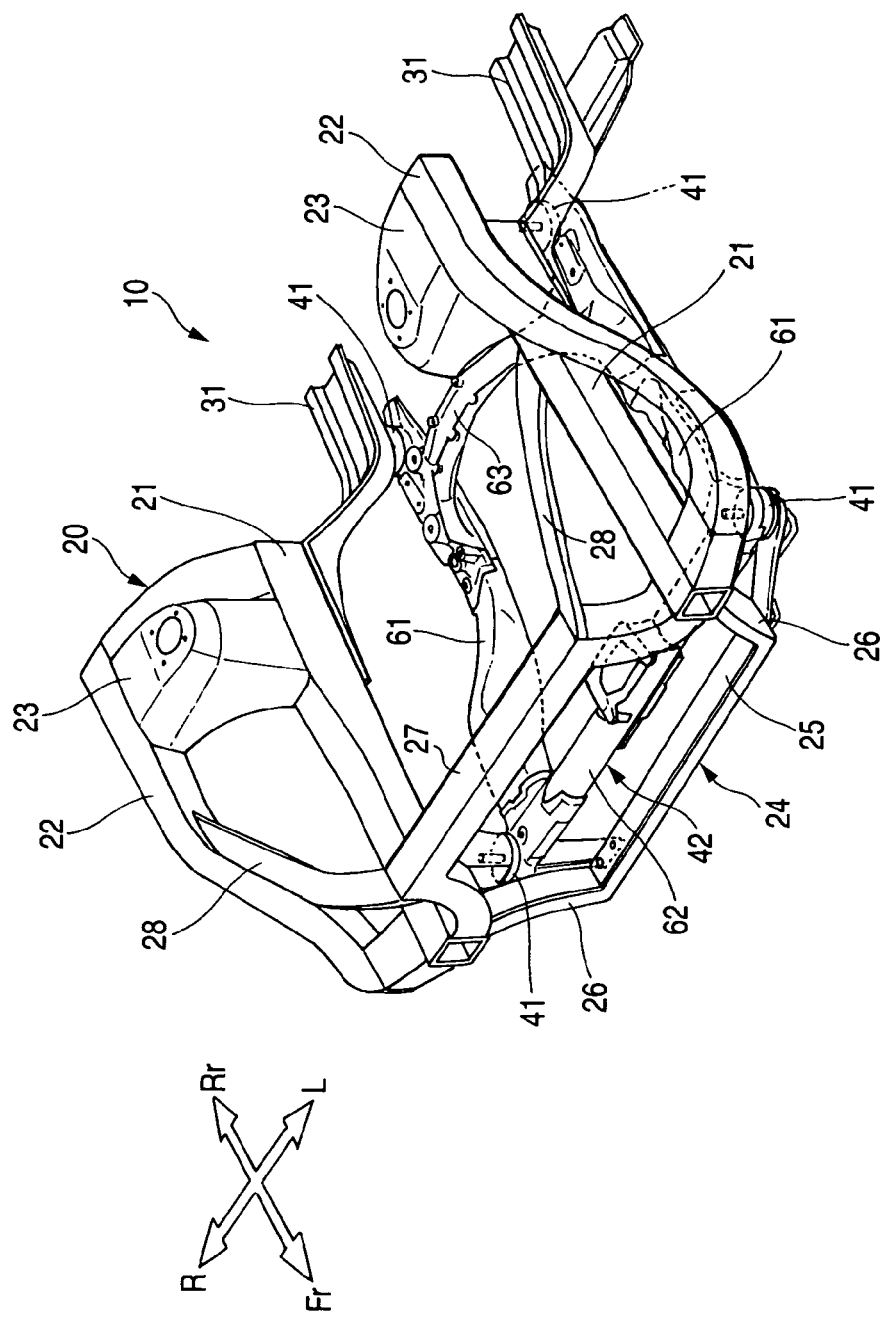
FIG. 1 is a perspective view of a front part of a vehicle according to the invention.

Note that in the drawings, reference numerals denote as below: 10 denotes a vehicle, 20 denoting a body frame, 42 a front subframe, 43 a power source (an engine), 61 left and right longitudinal members, 61*a* a front divided portion, 61*b* a rear divided portion, 62 a front cross member, 63 a rear cross member composite body, 64 left and right front joint portions (a first connecting member), 65 left and right reinforcement members (reinforcement plates), 67 a rear cross member, 71 left and right rear joint portions (sub-longitudinal member), 76 a location to which an arm is attached (an arm attaching location), 78 a positioning hole (a positioning mechanism), 157 an adjusting mechanism (a camber angle adjusting mechanism), 110 a front suspension, 133 a stabilizer, and 141 a steering gear box.

BEST MODE FOR CARRYING OUT THE INVENTION

A best mode for carrying out the invention will be described based on the accompanying drawings. Note that front/forward, rear/rearward, left/leftward, right/rightward, up/upward and down/downward denote such directions as viewed from the driver, Fr, Rr, L and R denote front side, rear side, left side and right side, respectively, and CL denotes the center of a vehicle (a transverse center of a vehicle).

Firstly, a vehicle will be described briefly based on FIGS. 1 to 3.

FIG. 1 is a perspective view of a front part of a vehicle according to the invention. A body frame (a body) 20 of a vehicle 10 is an integral or monocoque body in which a front part construction thereof is made up mainly of left and right front side frames 21, 21 which extend longitudinally on both sides of a front part of the body, left and right upper frames 22, 22 which extend longitudinally on transversely outboard sides of and above the front side frames 21, 21, left and right front damper housings 23, 23 which are provided to extend between the front side frames 21, 21 and the upper frames 22, 22 and a front bulkhead 24 which connects to front portions of the left and right front side frames and front portions of the left and right upper frames 22, 22.

The front bulkhead 24 is made up mainly of a lower cross member 25 which extends transversely below the front portions of the left and right front side frames 21, 21, left and right side stays 26, 26 which extend upward from both end portions of the lower cross member 25 and an upper cross member 27 which extends transversely so as to connect to upper ends of the side stays 26, 26.

The upper cross member 27 is such as to be joined to longitudinally intermediate portions of the left and right upper frames 22, 22 via left and right extensions 28, 28, which are extended from left and right end portions of the upper cross member 27 in such a manner as to be inclined rearwards.

The body frame 20, which is configured as has been described above, is constructed such that a front subframe 42 is suspended from front portions of the left and right front side frames 21, 21 and front end portions of left and right floor frames 31, 31 which extend rearwards from rear ends of the front side frames 21, 21 via four left front and rear and right front and rear vibration preventive elastic bushes 41 . . . ( . . . denotes plurality, and this is true hereinafter).

Figure 2:
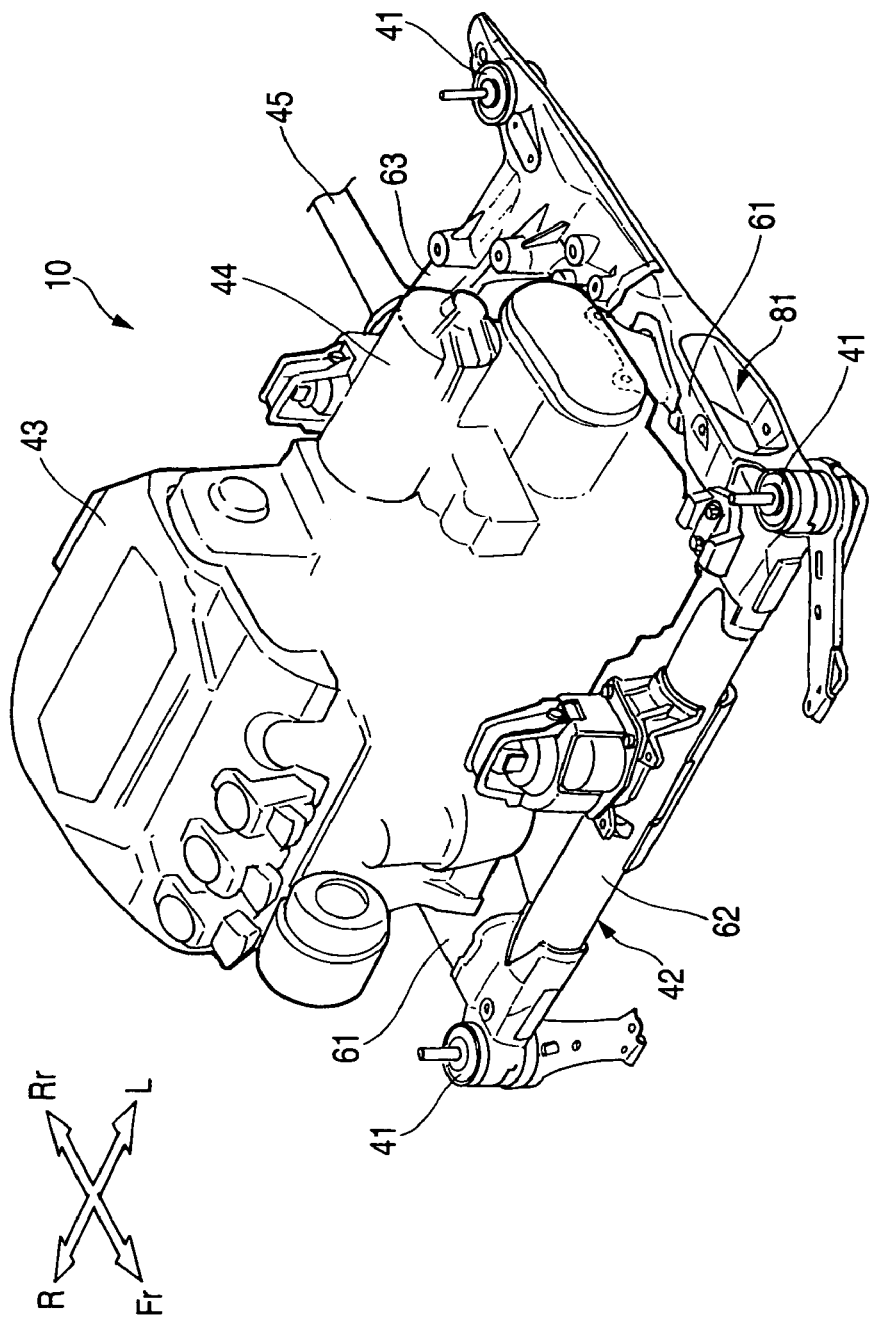
FIG. 2 is a perspective view of the periphery of a front subframe according to the invention.

FIG. 2 is a perspective view of the periphery of the front subframe. The front subframe 42 is such that a transversely placed engine (a power source) is mounted at a right half portion and a transmission 44 is mounted at a left half portion thereof. The transmission 44 has a propeller shaft 45 which extends rearwards from an output side thereof for transmission of power.

Figure 3:
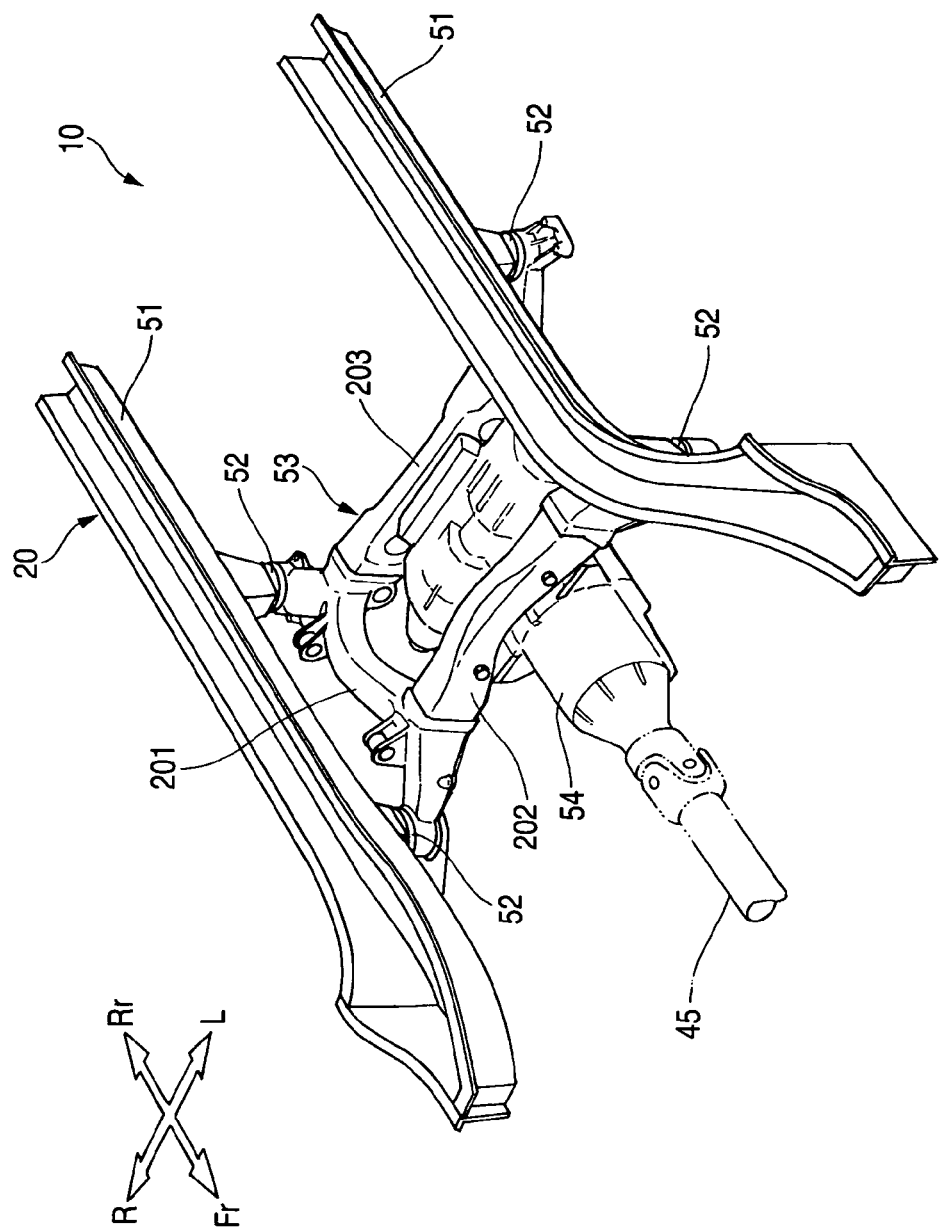
FIG. 3 is a perspective view of a rear part of the vehicle according to invention.

FIG. 3 is a perspective view of a rear part of the vehicle according to the invention. The rear part of the vehicle body frame 20 is made up mainly of left and right rear side frames 51, 51 which extend longitudinally on both sides of the rear part of the body and is constructed such that a rear subframe 53 is suspended from these rear side frames 51, 51 via four left front and rear and right front and rear vibration preventive elastic bushes 52 . . . .

The rear subframe 53 is such that a rear differential 54 is attached thereto using a suspending method. A front cross member 202 of the rear subframe 53 that is on a front side thereof exhibits a curved shape or an arch-like shape in order to avoid the interference with the rear differential 54. Note that reference numeral 201 denotes a longitudinal member and reference numeral 203 denotes a rear cross member.

Power transmitted from the propeller shaft 45 (refer to FIG. 2) can be distributed to be transmitted to left and right rear wheels by left and right drive shafts via differential gears within the rear differential 54. As is clear from the description that has been made heretofore and FIGS. 2 and 3, the vehicle 10 is a four-wheel drive vehicle in which front and rear wheels are driven by the engine (the power source) installed in the front part of the body.

Figure 4:
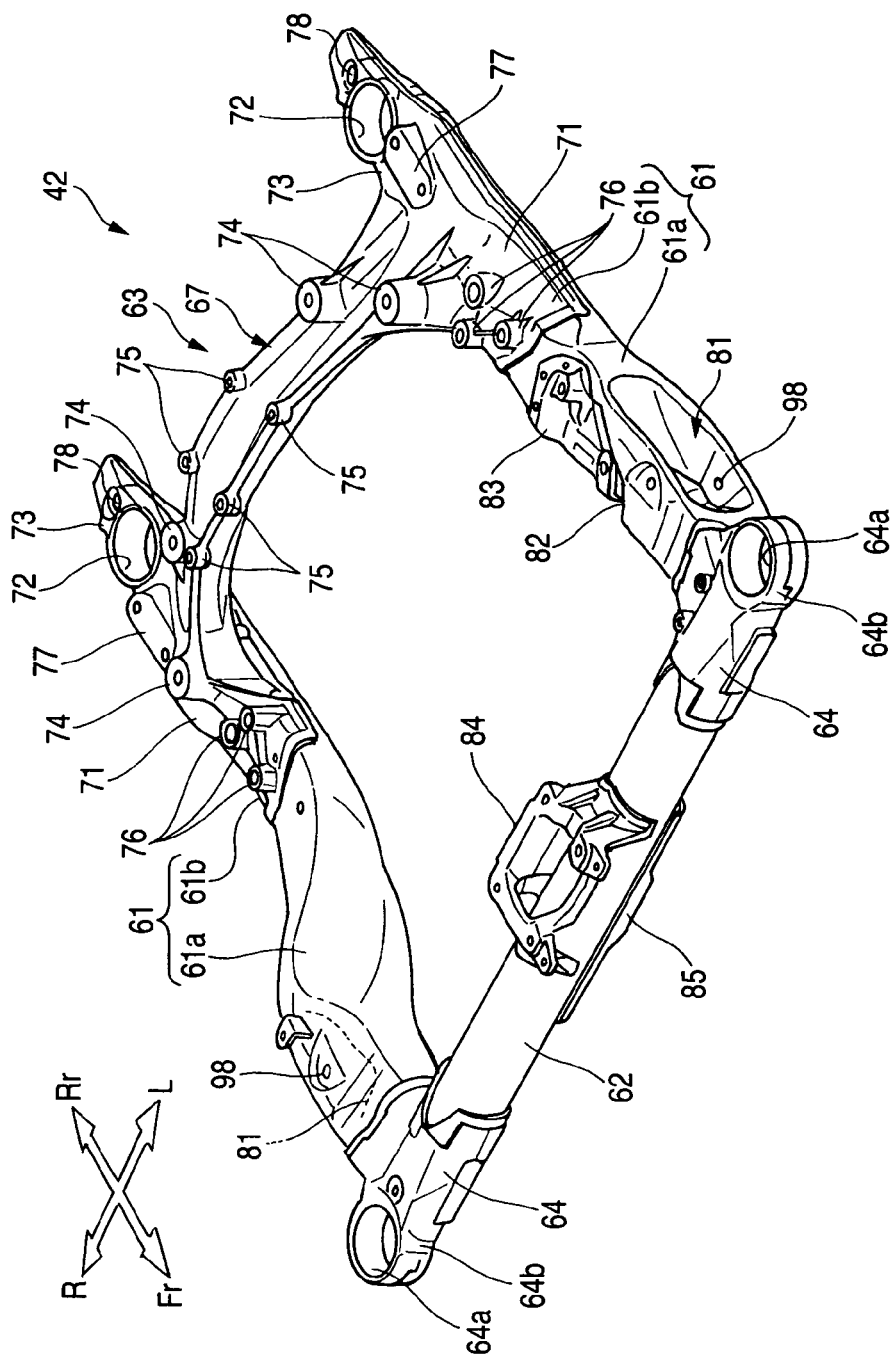
FIG. 4 is a perspective view of a front subframe according to the invention.
Figure 5:
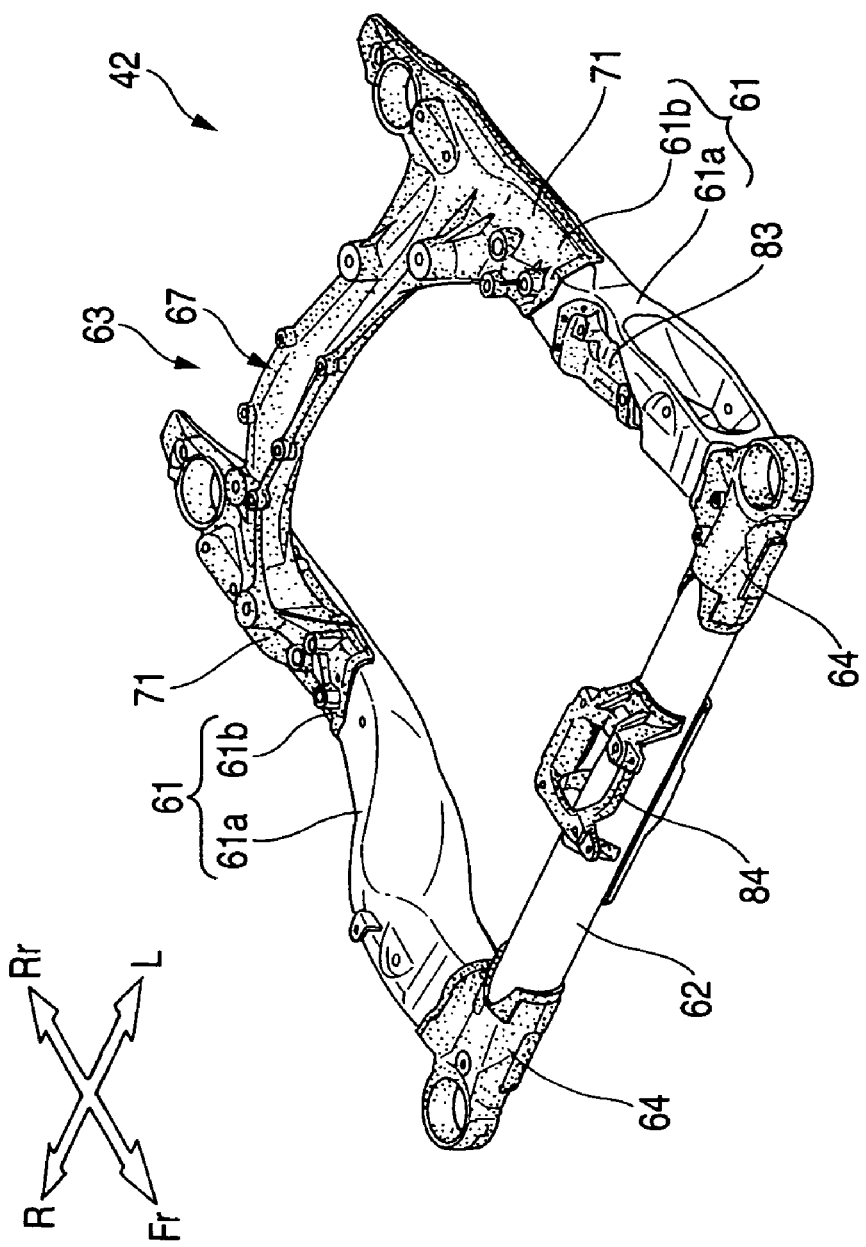
FIG. 5 is a drawing which explains materials of respective members which make up the front subframe according to the invention.
Figure 6:
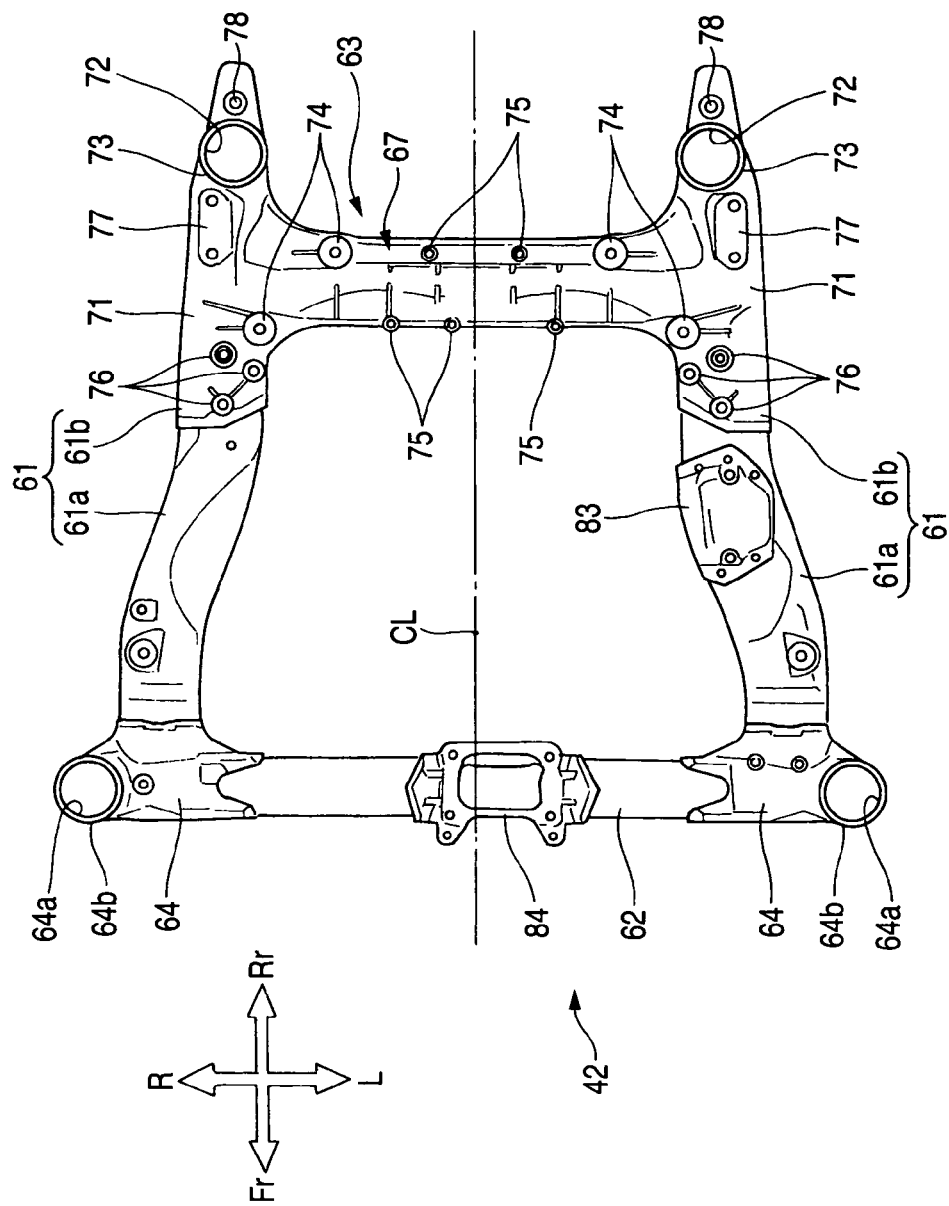
FIG. 6 is a plan view of the front subframe according to the invention.
Figure 7:
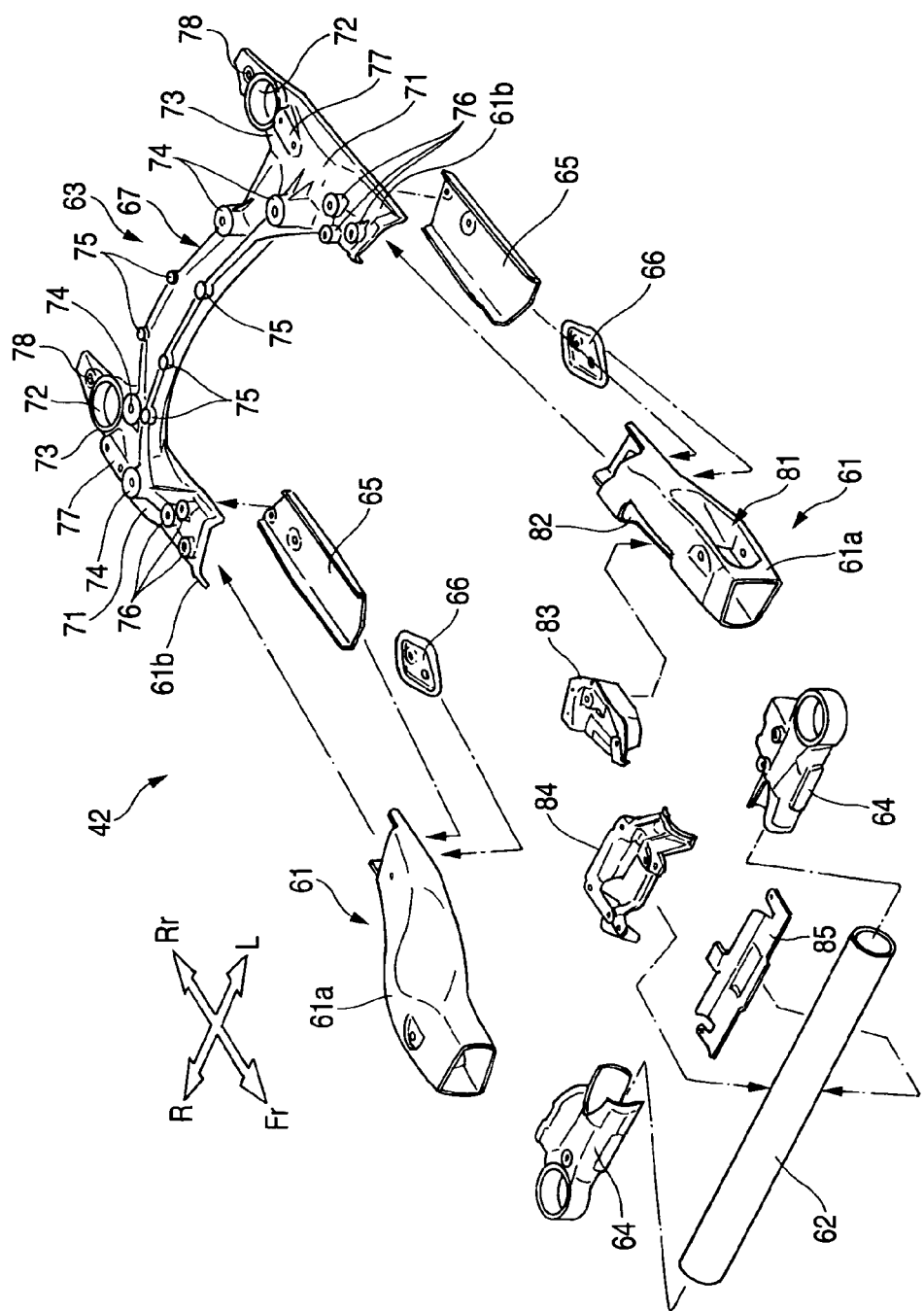
FIG. 7 is an exploded perspective view of the front subframe according to the invention, FIGS. 8(*a*) to 8(*b*) are drawings showing the configuration of a left longitudinal member according to the invention, FIGS. 9(*a*) to 9(*b*) are drawings showing the configuration of the left longitudinal member of the invention.

Next, the overall configuration of the front subframe 42 will be described based on FIGS. 4 to 7. FIG. 4 is a perspective view of the front subframe according to the invention. FIG. 5 is an explanatory drawing which explains materials at respective members that make up the front subframe according to the invention. FIG. 6 is a plan view of the front subframe according to the invention. FIG. 7 is an exploded perspective view of the front subframe according to the invention.

As is shown in FIGS. 4 and 5, the front subframe 42 is a product made of metallic material such as an aluminum product or aluminum alloy product (hereinafter, generally referred to as an aluminum alloy product). Of respective members shown in FIG. 5, white portions denote a material which is an extruded product (an extrusion molded product) or a drawn product (a pultrusion molded product) as a wrought product and shaded portions with dots denote a material which is a die-cast product.

Here, the wrought product includes all materials which include plate, string, painted plate, painted string, rod, line, seamless tube, welded tube, extruded section, forging, foil, welding rod and wire.

As shown in FIGS. 4, 6 and 7, the front subframe 42 exhibits, when viewed from the top, substantially a shape of parallel crosses (or the shape of #) or the shape of a Japanese Katakana "ロ (ro)" and includes left and right longitudinal members 61, 61 which extend in a longitudinal direction of the body, a front cross member 62 which extends in a transverse direction of the body so as to extend between front ends of these longitudinal members 61, 61, a rear cross member compound 63 which extends in the transverse direction of the body so as to extend between rear ends of the left and right longitudinal members 61, 61, left and right primary connecting members 64, 64 which function as left and right front joint portions which connect front divided portions 61a, 61a of the left and right longitudinal members 61, 61 to end portions of the front cross member 62, left and right reinforcement plates 65, 65 (refer to FIG. 7) which function as left and right reinforcement members which are applied to left and right lower surfaces of the rear cross member compound 63 and left and right secondary connecting members (joining members) which extend lower surfaces of the front divided portions 61a, 61a of the left and right longitudinal members 61, 61 to lower surfaces of the reinforcement plates 65, 65.

The left and right longitudinal members 61, 61 are made up of the front divided portions 61a, 61a and rear divided portions 61b, 61b which are formed integrally on the rear cross member compound 63, and the front divided portions 61a, 61a are side members which are molded products which are formed to have partially recessed and raised portions by bulging an angular pipe constituted by, for example, a tubular extruded product (an extrusion molded product). The front cross member 62 is a cross member constituted by a round pipe made up of, for example, an extruded product (an extrusion molded product). The left and right primary connecting members 64, 64 are die-cast products which exhibit, when viewed from the top, an L-shape, and are such that a body attaching portion 64 having a vertically penetrating through hole 64a in a corner is formed integrally therewith. The longitudinal members 61, 61 and the front cross member 62 are inserted into the left and right primary connecting members 64, 64 so that the longitudinal members 61, 61 and the front cross member 62 are joined together via the left and right primary connecting members 64, 64.

The rear cross member compound 63 is a cross member that is made up of a die-cast product formed into an H-shape when viewed from the top. To described in detail, the rear cross member compound 63 exhibits a shape with a substantially U-shaped cross section when viewed from the side and is such that a rear cross member 67 which is curved in an arc-like shape which is raised upwards and is provided centrally, left and right longitudinal submembers 71, 71 which function as left and right rear joint portions which extend in the longitudinal direction of the body at ends of the rear cross member 67 and rear divided portions 61b, 61b of the left and right longitudinal members 61, 61 which extend from the longitudinal submembers 71, 71 are formed integrally.

As shown in FIG. 7, the rear divided portions 61b, 61b of the left and right longitudinal members 61, 61 and the left and right longitudinal submembers 71, 71 are formed to have a downwardly facing angular U-shaped cross section and are such that body attaching portions 73, 73 which have vertically penetrating through holes 72, 72 at rear portions thereof are formed integrally therewith. On the other hand, the left and right reinforcement plates 65, 65 are formed to have a upwardly facing angular U-shaped cross section. The reinforcement plates 65, 65 are superposed on at least front half portions of lower surfaces of the rear divided portions 61b, 61b and the longitudinal submembers 71, 71 so as to be joined thereto, whereby the rear divided portions 61b, 61b and the longitudinal submembers 71, 71 can be made to have a closed cross section.

Furthermore, by (1) joining the front divided portions 61a, 61a of the left and right longitudinal members 61, 61 to the rear divided portions 61b, 61b which are formed integrally with the left and right longitudinal submembers (the left and right rear joint portions) 71, 71, and (2) applying the reinforcement plates 65, 65 to the lower surfaces of the rear divided portions 61b, 61b of the left and right longitudinal members 61, 61 and the lower surfaces of the longitudinal submembers 71, 71 and superposing the secondary connecting members (the joining members) 66, 66 on the front divided portions 61a, 61a and the reinforcement plates 65, 65 so as to be joined thereto, (3) the front divided portions 61a, 61a of the longitudinal members 61, 61 can be jointed integrally to the rear cross member compound 63.

As is clear from the description that has been made heretofore, the reinforcement plates 65, 65 and the secondary connecting members 66, 66 function as connecting members and reinforcement members which integrally join the front divided portions 61a, 61a of the longitudinal members 61, 61 to ends of the rear cross member compound 63.

The rear cross member compound 63, which is configured as has been described above, includes integrally a plurality (for example, four left front and rear and right front and rear) primary boss portions 74 . . . which project upwards from left and right ends of a front edge and a rear edge of the rear cross member compound 63 and a plurality of secondary boss portions 75 . . . which project upwards from central portions of the front edge and the rear edge of the rear cross member compound 63.

The left and right longitudinal submembers (the left and right rear joint portions) 71, 71 each include integrally three arm attaching portions 76 . . . which function as joining locations which project upwards at a front upper portion thereof and to which an adjusting mechanism for adjusting a camber angle is joined and positioning holes 78, 78 which function as positioning mechanisms which are used when the front subframe 42 is attached to the body frame 20 (refer to FIG. 1). Note that a camber angle adjusting mechanism as the adjusting mechanism will be described in detail in FIGS. 16t, 17.

Incidentally, the front divided portions 61a, 61a of the left and right longitudinal members 61, 61 have brackets (recessed portions) 81, 81 (refer to FIG. 8) which are made to open outwards in the transverse direction of the body. The front divided portion 61a of the left longitudinal member 61 includes a die-cast cover 83 which closes a transmission supporting opening 82 which is opened in an upper portion thereof.

The front cross member 62 is such that a power plant supporting portion 84 is attached to a center of an upper portion and a jacking up portion 85 is attached to a center of a lower portion thereof.

Next, the bracket 81 provided at the front divided portion 61a of the left longitudinal member 61 will be described. Note that the bracket 81 provided at the front divided portion 61a of the right longitudinal member 61 is configured the same as the bracket 81 on the left longitudinal member 61, and hence the description thereof will be omitted.

Figure 8A:
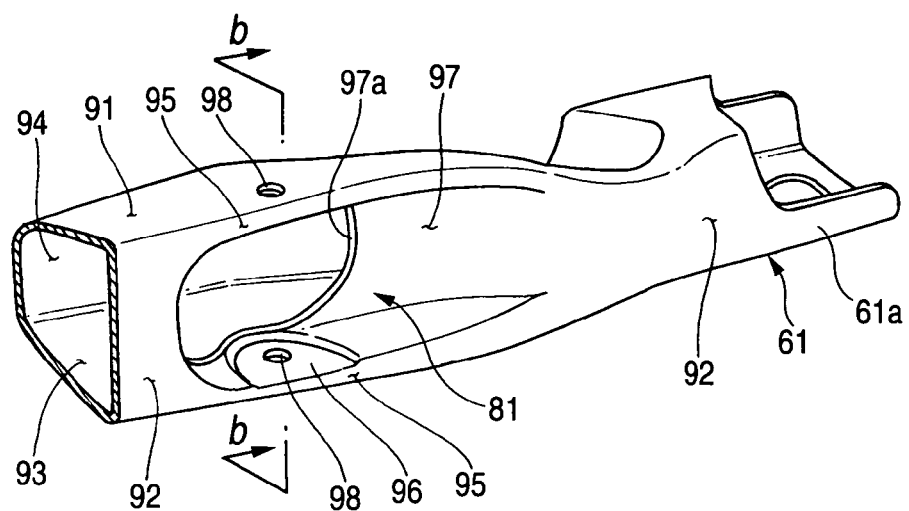
Figure 8B:
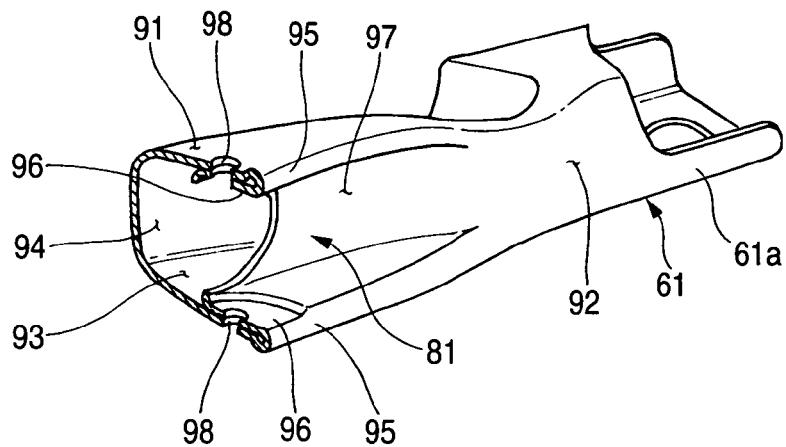

FIGS. 8(a), 8(b) are drawings which show the configuration of the left longitudinal member according to the invention, in which FIG. 8(a) shows the configuration of a main part of the front divided portion 61a of the left longitudinal member 61, and FIG. 8(b) shows a cross-sectional configuration of the main part of the longitudinal portion which is taken along the line b-b in FIG. 8(a).

Figure 9A:
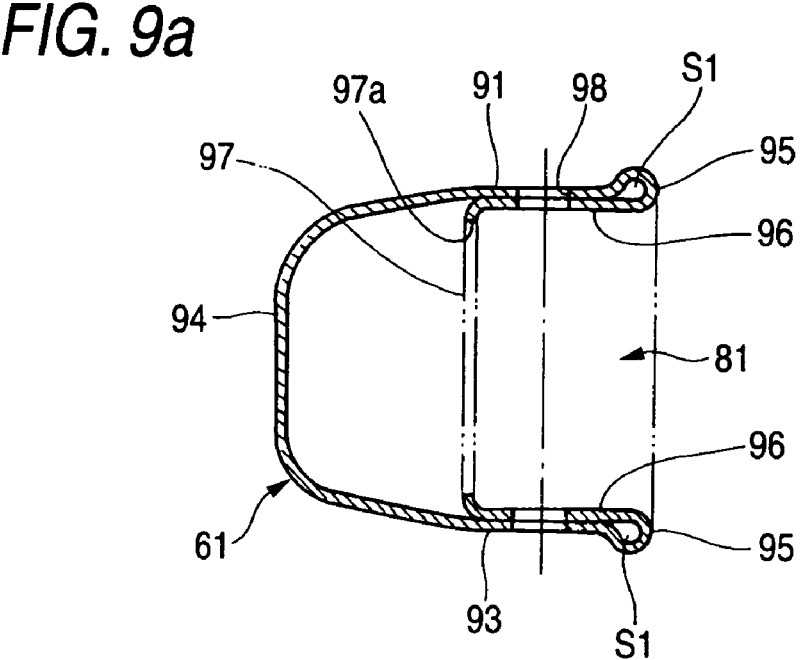
Figure 9B:
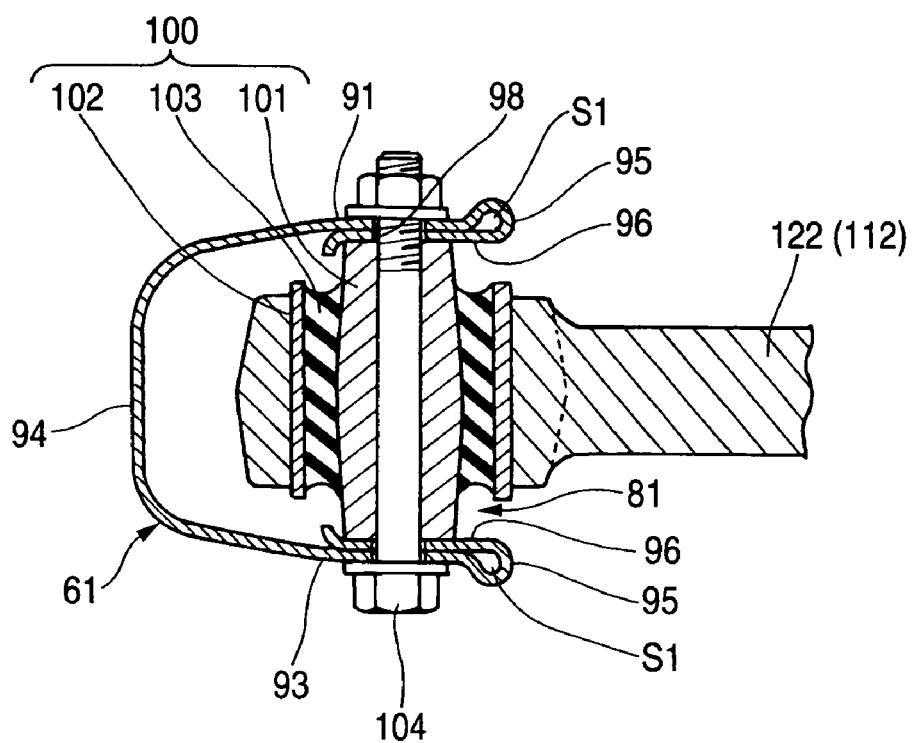

FIGS. 9(a), 9(b) are drawings which show the configuration of the left longitudinal member according to the invention, in which FIG. 9(a) shows the configuration of a cross section that is taken along the line b-b in FIG. 8(a) and FIG. (9b) shows a bush attaching construction in which the elastic bush 100 is attached to the cross-sectional portion shown in FIG. 9(a).

As shown in FIGS. 8 and 9(a), the front divided portion 61a of the left longitudinal member 61 is a frame that is made up of a tubular member, and this tubular member is a member that is formed into a shape with a substantially quadrangular closed cross section by an upper plate 91, an outboard plate 92, a lower plate 93 and an inboard plate 94. The outboard plate 92 corresponds to a left side of the front subframe 42 shown in FIG. 4.

The front divided portion 61a of the left longitudinal member 61 is such that a cross-sectional shape of the front divided portion 61a is configured so as to be recessed into the inside of the cross section at a longitudinally intermediate portion of the front divided portion 61a as viewed in a direction which intersects with an axis of the front divided portion 61a at right angles as shown in FIG. 9(a), so that a recessed portion 81 so formed is made to function as a bracket and a through hole 97a is formed in a bottom 97 of the recessed portion 81.

A specific configuration of the recessed portion 81 is a cross-sectional shape that is formed by folding back the outboard plate 92 into the closed cross section from an edge of the upper plate 91 and an edge of the lower plate 93 and causing the outboard plate 92 so folded back to extend inwards along the upper plate 91 and the lower plate 93 via upper and lower folded-back portions 95, 95 which are formed by the outboard plate 92 so folded back to thereby make the outboard plate 92 so folded back function as upper and lower bracket plate portions 96, 96, a portion between distal ends of the outboard plate 92 so folded back is made to constitute the bottom 97, and a through hole 97a is opened in the bottom 97.

The upper bracket plate portion 96 is a flat plate which contacts an inner surface of the upper plate 91, and the lower bracket plate portion 96 is a flat plate which contacts an inner surface of the lower plate 93. Thus, the upper bracket plate portions 96, 96 can be formed on an internal surface of the recessed portion 81.

The bottom 97 is, as shown in FIG. 9, a flat plate which becomes substantially parallel to the inboard plate 94 at a position is recessed from the inboard plate 94 to form a certain gap between the inboard plate 94 and itself. The through hole 97a is a large hole that is opened as far as the vicinities of upper and lower edges of the bottom 97. Since the bottom 97 is less affected by an external force, the reduction in weight of the longitudinal member 61 can be realized by opening the through hole 97a therein.

As shown in FIG. 9(a), the folded-back portions 95, 95 are portions that are folded back so as to exhibit cross-sectional shapes which are slightly distended in a vertical direction from the edges of the upper plate and lower plate 91, 93 to the bracket plate portions 96, 96 to thereby form annular shapes, respectively. Due to this, the folded-back portions 95, 95 have a certain space portions S1, S1 therein. Consequently, the folded-back portions 95, 95 can be referred to as portions which are formed continuously to the longitudinal member 61 which is the tubular member. The folded-back portions 95, 95 and the bracket plate portions 96, 96 face each other across the certain space portions S1, S1.

As is clear from the description that has been made heretofore, the recessed portion 81, that is, the bracket 81 has the bracket plate portions 96, 96 and the folded-back portions 95, 95 that are folded back from the bracket plate portions 96, 96. Thus, the bracket 81 is characterized in that the bracket 81 is provided integrally on the longitudinal member 61 constituted by the tubular frame at the longitudinally intermediate position thereof (refer to FIG. 8(a)). Furthermore, the bracket 81 has a vertically penetrating bolt hole 98. This bolt hole 98 is such as to penetrate through the upper plate 91, the lower plate 93 and the upper and lower bracket plate portions 96, 96.

FIG. 9(b) shows a bush attaching construction in which an elastic bush 100 is attached to the longitudinal member 61 at the bracket 81. The elastic bush 100 is a vibration preventive member that is configured such that an inner tube 101 and an outer tube 102 which surrounds the outer tube 101 are connected together at an elastic material 103 such as rubber, and an arm member such as a lower arm 112 of a front suspension is provided integrally on the outer tube 102.

The bracket 81 is characterized in that the bracket 81 is disposed in such a manner that ends of the inner tube 101 are held between the bracket plate portions 96, 96 and in that the bracket 81 is attached by a bolt 104 which passes through the inner tube 101 and the bolt penetrating hole 98. The upper and lower bracket plate portions 96, 96 have planes which are brought into contact with respective end faces of the inner tube 101.

The upper plate 91 and the upper bracket plate portion 96 are superposed on each other and the lower plate 93 and the lower bracket plate portion 96 are superposed on each other, whereby the rigidity is increased, and the elastic bush 100 be fastened and supported by the two upper and lower plates.

Next, the configuration of the periphery of the front subframe 42 and a front suspension will be described based on FIGS. 10 to 12. Note that since left and right front suspensions 110, 110 are similar to each other, only a left front suspension will be described and the description of a right front suspension will be omitted here.

Figure 10:
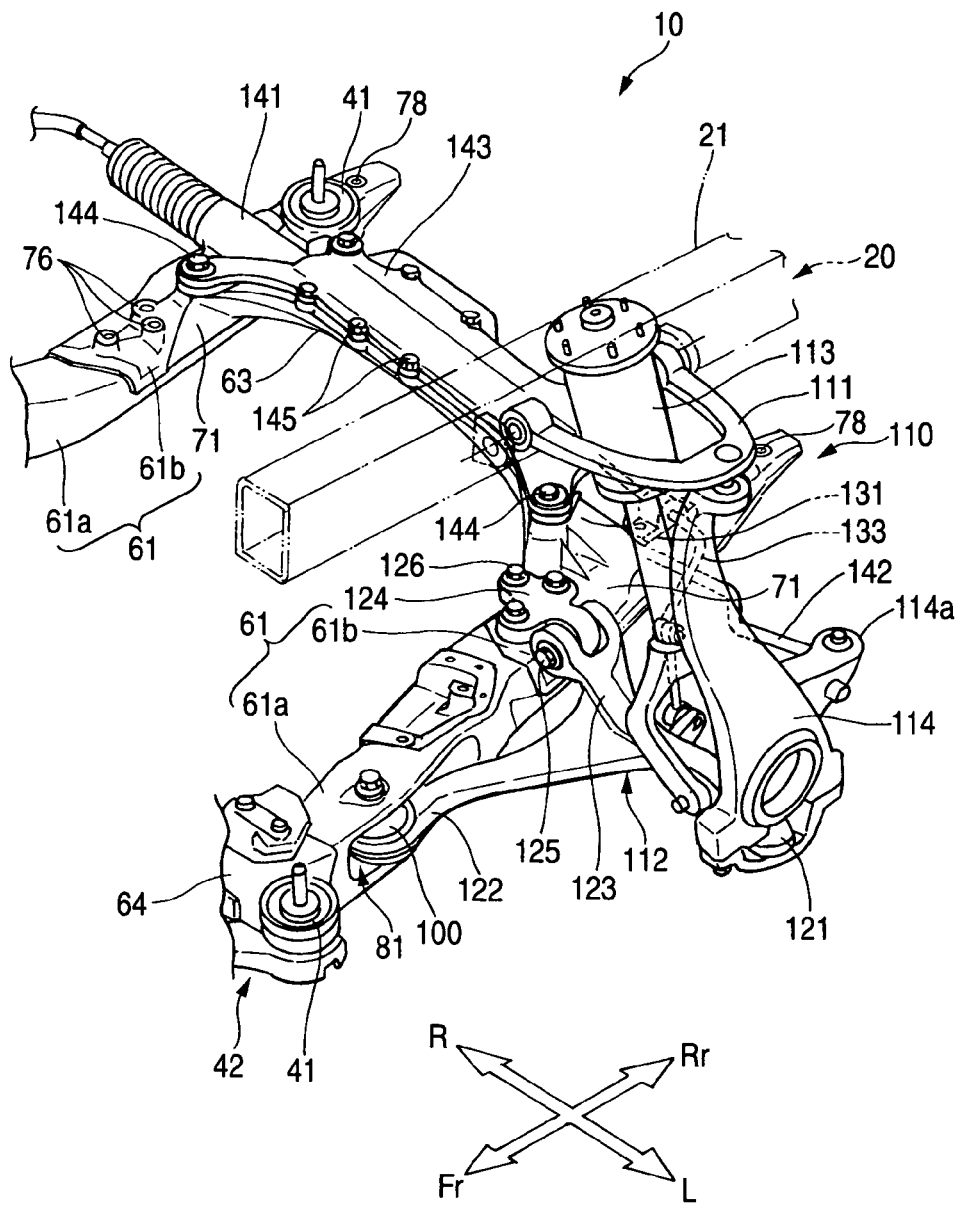
FIG. 10 is a perspective view which shows a state in which a front suspension and a steering gear box are attached to the front subframe according to the invention.

FIG. 10 is a perspective view which shows a state in which the front suspension and a steering gear box are attached to the front subframe according to the invention.

Figure 11:
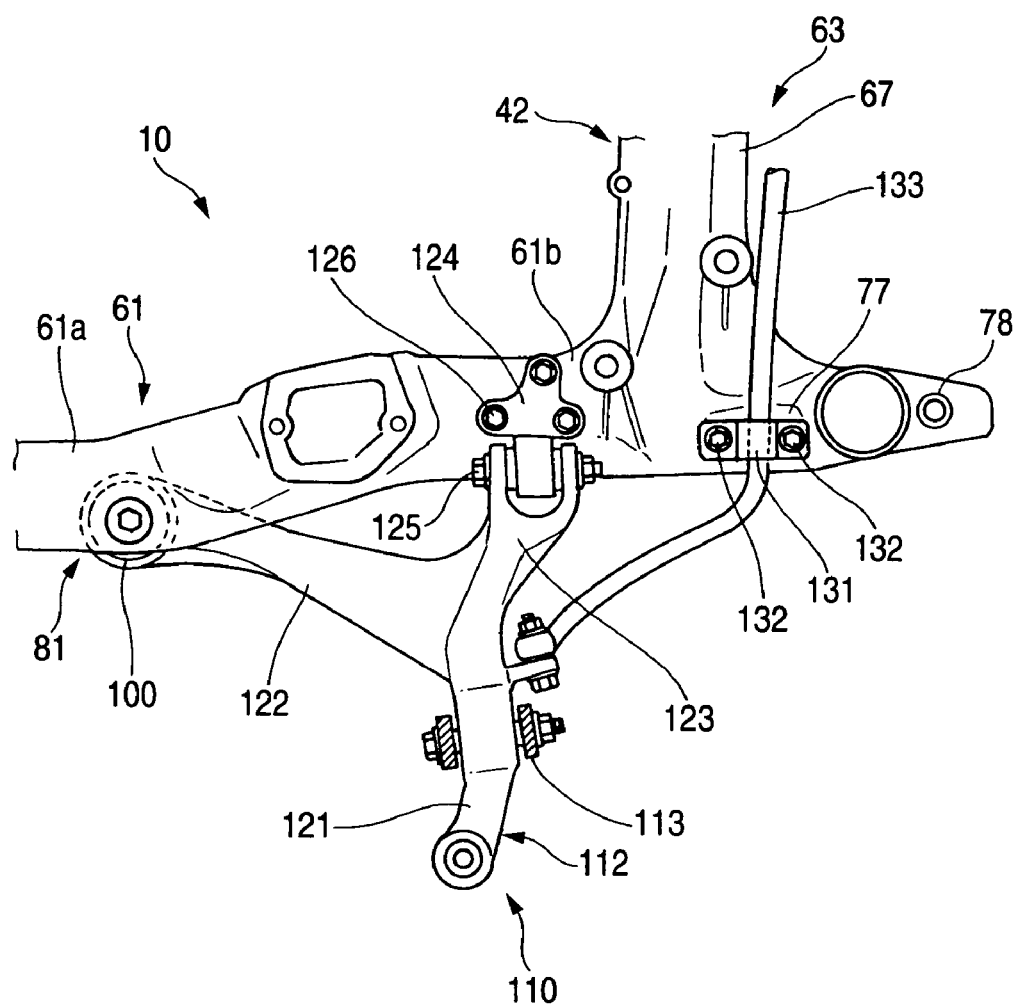
FIG. 11 is a plan view of a main part where the front suspension is attached to the front subframe according to the invention.

FIG. 11 is a plan view of a main part where the front suspension is attached to the front subframe according to the invention.

Figure 12:
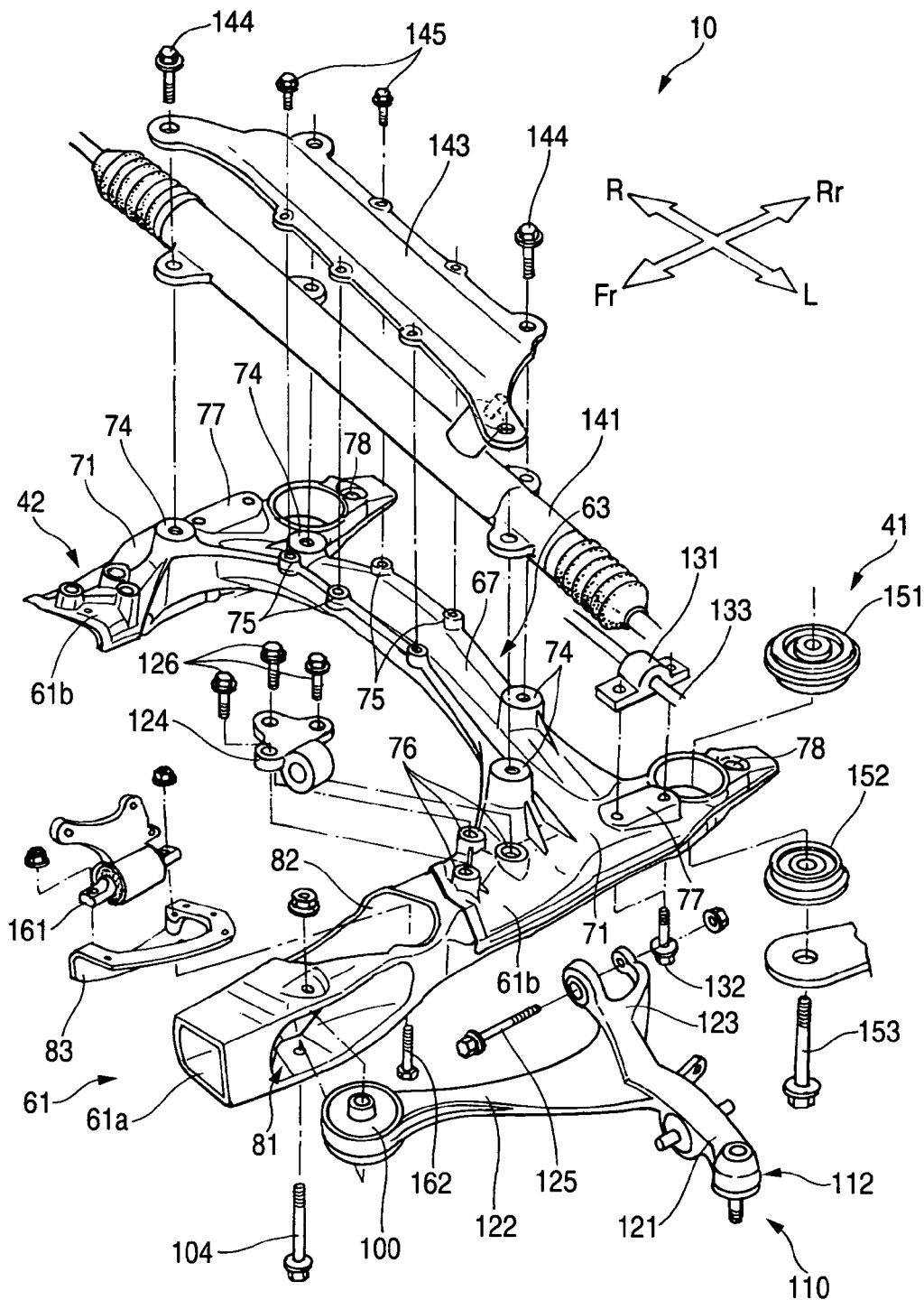
FIG. 12 is an exploded perspective view showing the state in which the front suspension and the steering gear box are attached to the front subframe according to the invention, FIGS. 13(*a*) to 13(*c*) are drawings which show the function of the front subframe of a body frame structure according to the invention.

FIG. 12 is an exploded view of the front subframe according to the invention, the front suspension and the steering gear box.

As is shown in FIG. 10, a left front suspension 110 is a front wheel suspension system for suspending a front wheel from the body frame 20 which is made up mainly of an upper arm 111 which is attached to the front side frame 21 in such a manner as to swing, a lower arm 112 which is attached to the front divided portion 61a of the left longitudinal member 61 and the left longitudinal submember (the left rear joint portion) 71 in such a manner as to swing, a front cushion 113 attached between the upper arm 111 and the front damper housing 23 (refer to FIG. 1) and a knuckle 114 connected to the upper arm 111 and the lower arm 112.

As shown in FIGS. 10 to 12, the lower arm 112 is a member in which a front arm 122 and a rear arm 123 are extended forward and rearward from a knuckle connecting portion 121 where the knuckle is connected to thereby form a Y-shape when viewed from the top. A distal end portion of the front arm 122 is to be attached to the bracket 81 of the longitudinal member 61 via the elastic bush 100 with a bolt 104 in such a manner as to swing vertically (refer to FIG. 9(b) as well). On the other hand, a distal end portion of the rear arm 123 is to be attached to a rear bracket 124 via an elastic bush (not shown) with a bolt 125 in such a manner as to swing vertically. The rear bracket 124 is such as to be attached to the arm attaching portions 76 . . . of the longitudinal subframe (the rear joint portion) 71 with bolts 126 . . . .

The longitudinal submember (the rear joint portion) 71 is such that a stabilizer bracket 131 is attached to a stabilizer attaching portion 77 with bolts 132, 132. The stabilizer bracket 131 is a member which supports a rod-like stabilizer 133 which connects between the left and right lower arms 112 (only the left one is shown).

The rear cross member 67 (the rear cross member compound 63) doubles as a member which fixes the steering gear box 141 which extends in the transverse direction of the body. The steering gear box 141 is a member which accommodates therein a gear mechanism (for example, a power steering type gear mechanism) which converts a steering wheel turning force from a steering wheel, not shown, to a steering force in the transverse direction of the body so that the force so converted is taken out of a tie rod 142. The tie rod 142 is to be connected to an arm 114a of the knuckle 11.

The steering gear box 141 and a cover 143 made of an aluminum die-cast product are superposed on the cross member 67 (the rear cross member compound 63) in that order from above, and these members are fastened together to the primary boss portions 74 . . . with bolts 144 . . . , and furthermore, the cover 143 is fastened to the secondary buss portions 75 with bolts 145, whereby the steering gear box 141 can be attached to the front subframe 42.

The vibration preventive elastic bushes 41, via which the four corners of the front subframe 42 are attached to a lower portion of the body frame 20, are each made up of elastic bush members 151, 152 which are divided vertically and an attaching bolt 153.

The transmission supporting opening 82 in the left longitudinal member 61 is such that a vibration preventive elastic bush 161 is attached to the cover 83 with bolts 162 . . . . This elastic bush 161 is a member which mounts the transmission 44 (refer to FIG. 2) on the front subframe 42, FIGS. 13(a) to 13(c) are explanatory drawings which explain the function of the front subframe of a body frame structure according to the invention, in which FIG. 13(a) is a plan view of the front subframe, FIG. 13(b) is a side view of the front subframe, and FIG. 13(c) is a bottom view of the front subframe.

Figure 13A:
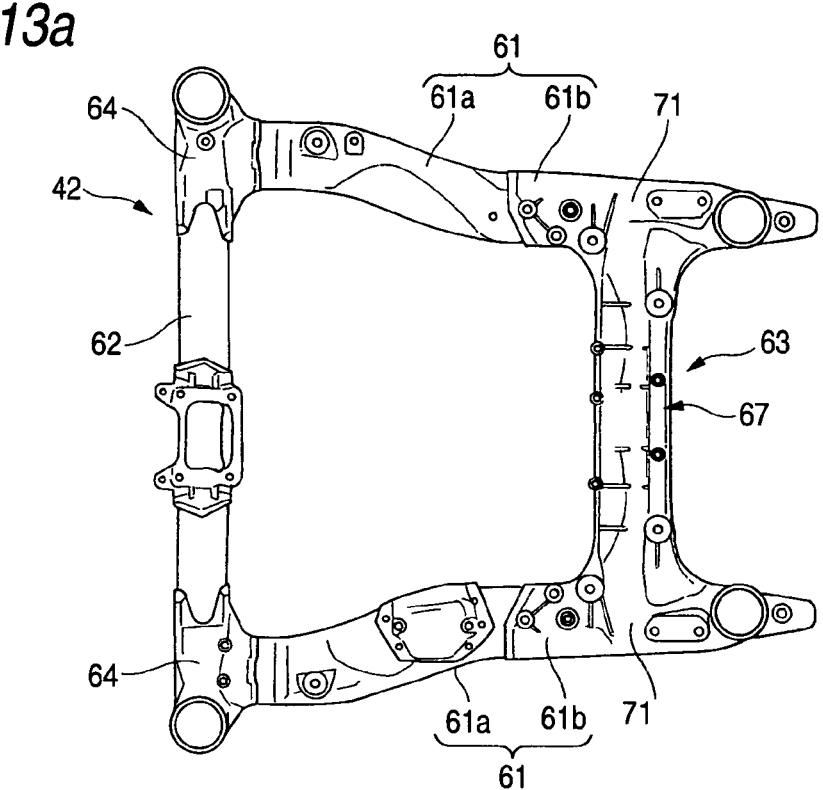
Figure 13B:
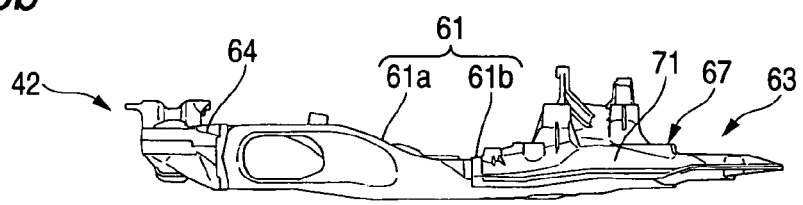
Figure 13C:
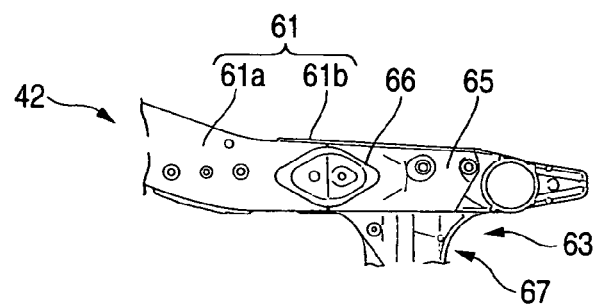

In a body frame structure according to the invention which is such as to include the front subframe 42 that supports drive train parts including the power source (the engine) 43 (refer to FIG. 2), steering system parts including the steering gear box 141 (refer to FIG. 10) and suspension system parts including the front suspension 110 and which is supported on the body frame (the body) 20 side, as shown in FIG. 13(a), the front subframe 42 is formed of the aluminum alloy (including aluminum, and the same is true hereinafter) into a frame that is formed substantially into a shape of parallel crosses or into a rectangular shape and is made up of the left and right primary connecting portions 64, 64 (hereinafter, described as left and right front joint portions 64, 64) and the left and right longitudinal submembers 71, 71 (hereinafter, described as left and right rear joint portions 71, 71) which are disposed at the corners of the frame that is formed substantially into the shape of parallel crosses or the rectangular shape, and the left and right longitudinal members 61, 61 and the front and rear cross members 62, 67 which connect the joint portions 64, 64, 71, 71 together, the left and right front joint portions 64, 64 and the left and right rear joint portions 71, 71 being formed of the aluminum alloy die-cast product, whereas the left and right longitudinal members 61, 61 are formed of the aluminum alloy wrought product.

For example, it is preferable to increase the load transmission performance and the shape maintaining performance of the front subframe since a load resulting from an inputted impact can be dispersed, so that the load so dispersed can be absorbed, and it will be preferable in case the rigidity can be increased without increasing the thickness of sheets metal since an increase in vehicle weight can be suppressed.

To make this happen, the front subframe 42 is formed of the aluminum alloy into the frame that is formed substantially into the shape of parallel crosses or into the rectangular shape and is made up of the left and right front joint portions 64, 64 and the left and right rear joint portions 71, 71 which are disposed at the corners of the frame that is formed substantially the shape of parallel crosses or the rectangular shape, and the left and right longitudinal members 61, 61 and the front and rear cross members 62, 67 which connect the joint portions 64, 64, 71, 71 together, the left and right front joint portions 64, 64 and the left and right rear joint portions 71, 71 being formed of the aluminum alloy die-cast product, whereas the left and right longitudinal members 61, 61 are formed of the aluminum alloy wrought product.

Namely, in FIG. 13(b), the load transmission performance and the shape maintaining performance of the front subframe 42 are increased and the suppression of increase in vehicle weight is realized by forming the left and right front joint potions 64, 64 (the left 64 is not shown) and the left and right rear joint portions 71, 71 (the left 71 is not shown) of the aluminum alloy die-cast product and forming the left and right longitudinal members 61, 61 (the left 61 is not shown) of the aluminum alloy wrought product. As a result, not only can the riding comfort be increased but also the fuel economy can be increased.

The body frame structure according to the invention is such that, as shown in FIGS. 13 (a) to 13(c), the left and right longitudinal members 61, 61 are divided into the left and right front divided portions 16a, 16a and the left and right rear divided portions 61b, 61b, the left and right rear divided portions 61b, 61b, the left and right rear joint portions 71, 71 and the rear cross member 67 are formed integrally of the aluminum alloy die-cast product, and the reinforcement plate 65 (hereinafter, described as a left reinforcement member 65) that is formed of the aluminum alloy wrought product is extended from the left front divided portion 61a to the left rear joint portion 71 so that the left reinforcement member 65 is fixed to the left rear divided portion 61a and the left rear joint portion 71, while the right reinforcement plate 65 (hereinafter, described as a right reinforcement member 65)that is formed of the aluminum alloy wrought product is extended from the right front divided portion 61a to the right rear joint portion 71 so that the right reinforcement member 65 is fixed to the right rear divided portion 61b and the right rear joint portion 71.

By forming the left and right divided portions 61b, 61b and the left and right rear joint portions 71, 71 and the rear cross member 67 integrally of the aluminum alloy die-cast product, for example, when the steering gear box 141 (refer to FIG. 10) is fixed, for example, to the rear cross member 67, the steering gear box 141 is strongly and rigidly supported on the rear cross member 67. As a result, the steering wheel operation feel can be improved.

In addition, by extending the left reinforcement member 65 that is formed of the aluminum alloy wrought product from the left front divided portion 61a to the left rear joint portion 71 so that the left reinforcement member 65 is fixed to the left rear divided portion 61a and the left rear joint portion 71 and extending the right reinforcement member 65 that is formed of the aluminum alloy wrought product from the right front divided portion 61a to the right rear joint portion 71 so that the right reinforcement member 65 is fixed to the right rear divided portion 61a and the right rear joint portion 71, the load transmission performance and the shape maintaining performance can further be increased.

Here, the load transmission performance means a capability of dispersing an excessive load inputted into the front subframe 42 and absorbing the load so dispersed, and by increasing the load transmission performance, the increase in the impact absorbing characteristic of the front subframe 42 can be realized. In addition, the shape maintaining performance means a capability of maintaining the initial state of the front subframe 42, and by increasing the shape maintaining performance, the increase in the rigidity of the front subframe 42 can be realized.

Figure 14:
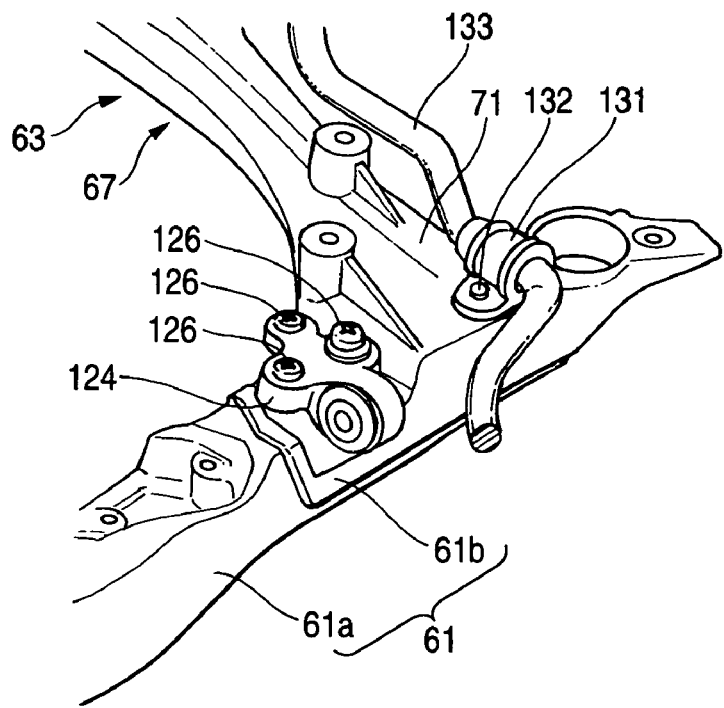
FIG. 14 is a perspective view showing a location where a stabilizer of the body frame structure according to the invention is attached.

FIG. 14 is a perspective view which shows an attaching portion where the stabilizer of the body frame structure according to the invention is attached, and by fixing the stabilizer 133 which suppresses the inclination of the body to the left rear joint portion 71 and the left reinforcement member 65, the stabilizer is shown as being fixed while straddling between the die-cast product and the wrought product.

Note that the stabilizer 133 is to be also fixed to the right rear joint portion 71 and the right reinforcement member 65 shown in FIG. 7.

Figure 15:
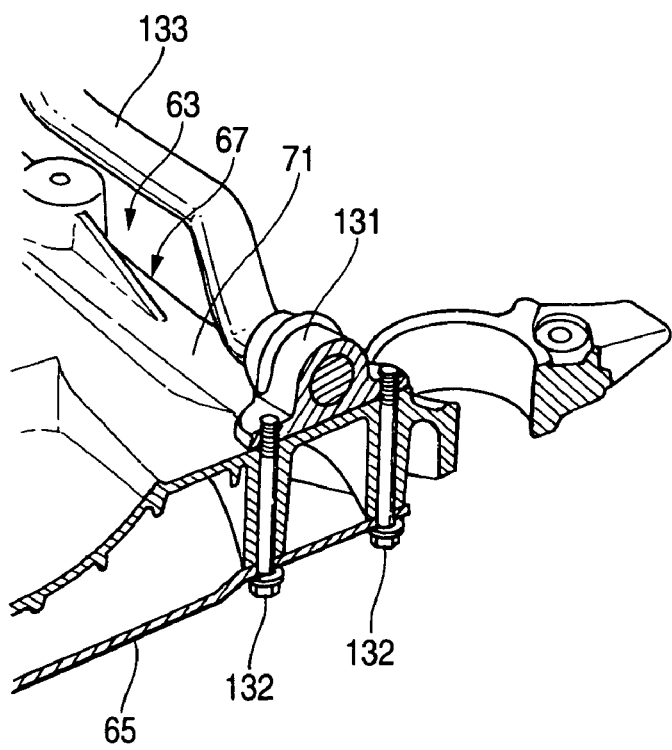
FIG. 15 is a perspective view showing a cross section where the stabilizer of the body frame structure according to the invention is attached.

FIG. 15 is a perspective view which shows an attaching cross section of the stabilizer of the body frame structure according to the invention, and by fixing the stabilizer 133 in such a manner as to straddle between the die-cast product (the left and right joint portions 71, 71) having a high rigidity and the wrought product (the left and right reinforce members 65, 65), even in the event that an excessive load is applied to the stabilizer 133, the stabilizer 133 can be held to the front subframe 42. As a result, the increase in attachment strength of the stabilizer 133 can be realized.

Figure 16:
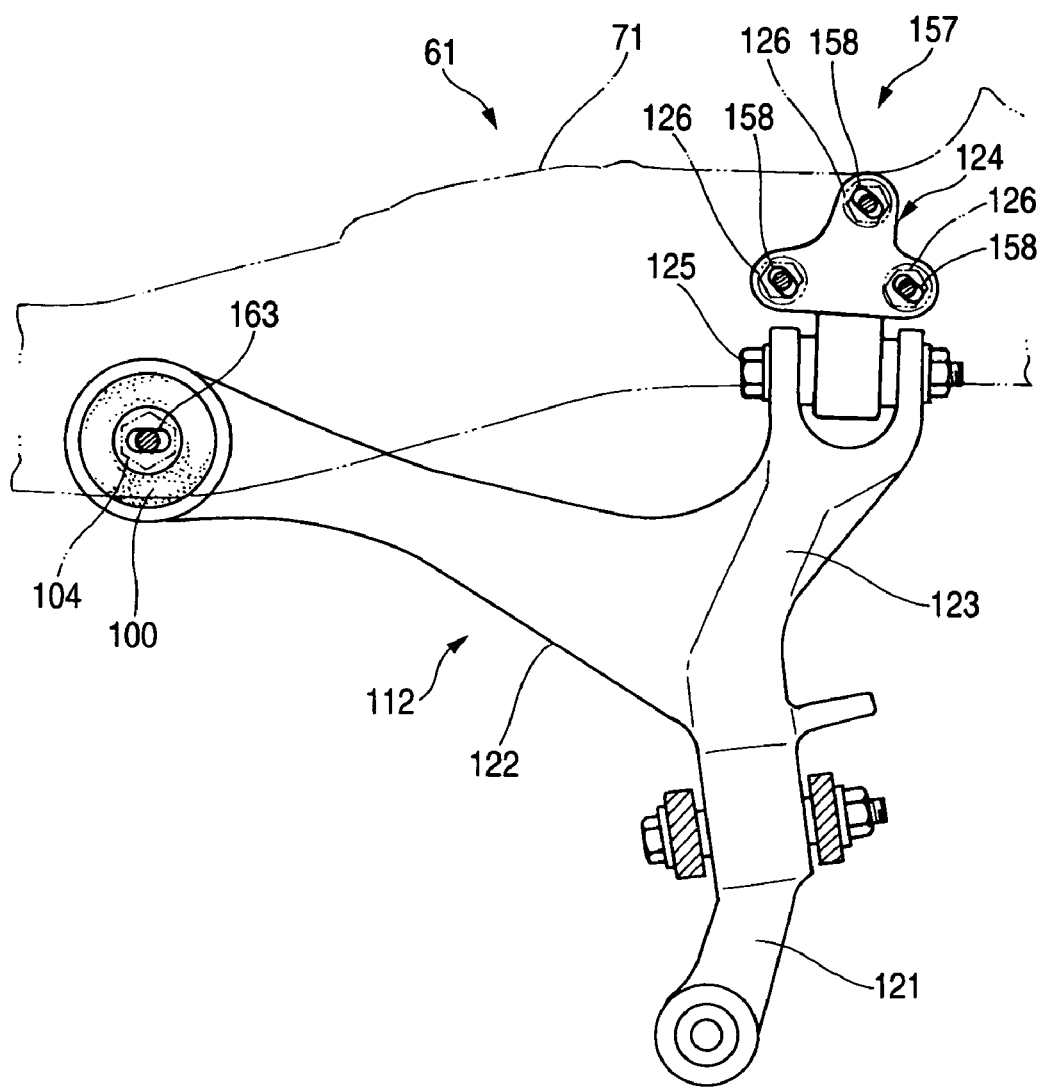
FIG. 16 is a plan view of a camber angle adjusting mechanism of the body frame structure according to the invention, FIGS. 17(*a*) to 17(*d*) are drawings which explain the function of a camber angle adjusting mechanism of the body frame structure according to the invention, FIGS. 18(*a*) to 18(*d*) are drawings which explain the function of a positioning mechanism of the body frame structure according to the invention.

FIG. 16 is a plan view of a camber angle adjusting mechanism of the body frame structure according to the invention, and a camber angle adjusting mechanism (an adjusting mechanism) 157 is made up of the arm attaching portions 76 . . . (hereinafter, described as connecting locations 76 . . . ) shown in FIG. 4 which are formed on the longitudinal submember 71 (hereinafter, referred to as a left rear joint portion 71) of the left longitudinal member 61, the rear bracket 124 that is attached to the connecting locations, the bolts 126 . . . which attach the bracket in such a manner as to be adjusted, the lower arm 112 that is supported on the rear bracket 124 via the bolt 125 in such a manner as to freely swing and which is also supported on the bracket (the recessed portion) 81 shown in FIG. 4 via the elastic bush 100 in such a manner as to freely swing and the bolt 104.

Namely, the camber angle adjusting mechanism 157 includes elongated holes 158 . . . in the rear bracket 124 which are adapted to fit on the bolts 126 . . . and an elongated hole 163 in the elastic bush 100 which is adapted to fit on the bolt 104, whereby the camber angle adjusting mechanism 157 is enabled to adjust the attachment position of the lower arm 112.

Note that a camber angle adjusting mechanism is provided on a right-hand side of the front subframe 42 which has a shape symmetrical with the camber angle adjusting mechanism 157 with respect to the center of the body.

FIGS. 17(a) to (d) are explanatory drawings which explain the function of the camber angle adjusting mechanism of the body frame structure according to the invention.

Figure 17A:
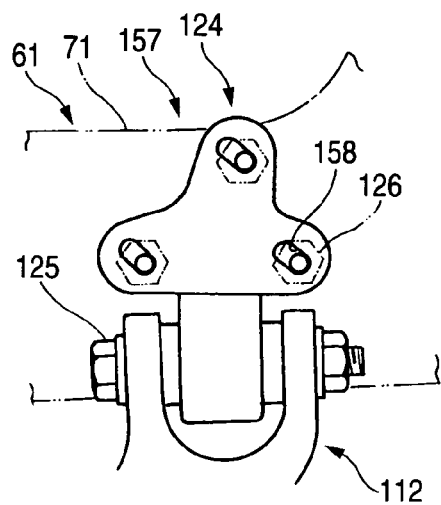

In FIG. 17(a), a state is shown in which the rear bracket 124 of the camber angle adjusting mechanism 157 is attached in such a manner as to be closer to the inside of the body.

Figure 17B:
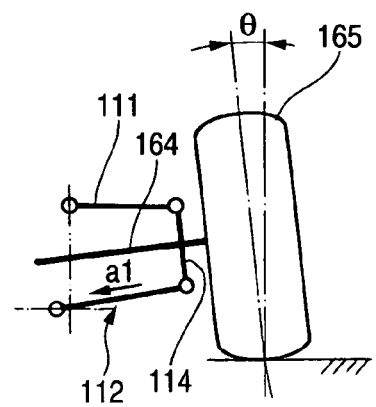

In FIG. 17(b), by attaching the rear bracket 124 in such a manner as to be closer to the inside of the body, the lower arm 112 can be drawn towards the inside of the body as indicated by an arrow a1. As a result, the camber angle θ can be set small. Note that reference numeral 164 is an axle, and 165 a front wheel.

Figure 17C:
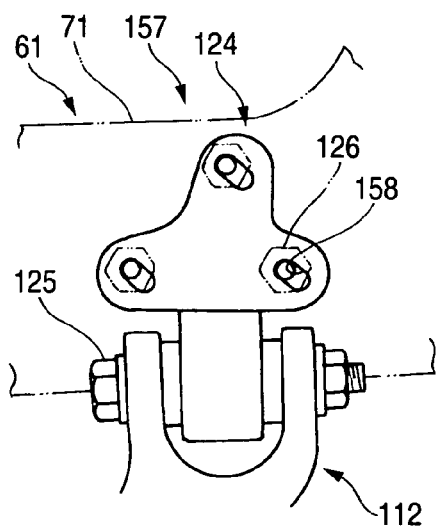

In FIG. 17(c), a state is shown in which the rear bracket 124 of the camber angle adjusting mechanism 157 is attached in such a manner as to be closer to the outside of the body.

Figure 17D:
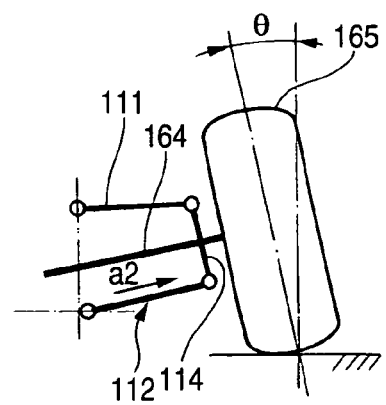

In FIG. 17(d), by attaching the rear bracket 124 in such a manner as to be closer to the outside of the body, the lower arm 112 is allowed to protrude towards the outside of the body as indicated by an arrow a2. As a result, the camber angle θ can be set large.

FIGS. 18(a) to (d) are explanatory drawings which explain the function of a positioning mechanism of the body frame structure according to the invention and show an example of an assembling method for assembling the front subframe 42 to the body frame 20.

In FIG. 18(a), a front subframe assembling method is such as to include the steps of preparing a lift device 168 for lifting up (raising) the front subframe 42 towards the body frame 20 side, providing a reference hole 166 in the body frame 20, providing a positioning hole (a positioning mechanism) 78 in the front subframe 42, and providing a jig pin 167 for aligning the positioning hole 78 with the reference hole 166 in the lift device 168, whereby aligning the front subframe 42 with the body frame 20 for assembly.

In FIG. 18(b), the lift device 168 is lifted up (raised) as indicated by an arrow b1, so that the positioning hole 78 in the front subframe 42 is positioned on the jig pin 167 of the lift device 168.

In FIG. 18(c), the lift device 168 and the front subframe 42 are lifted up as indicated by an arrow b2, so that the jig pin 167 of the lift device 168 is positioned in the reference hole 166 in the body frame 20. In this lifted state, the front subframe 42 is attached (fixed) to the body frame 20.

In FIG. 18(d), the lift device 168 is lowered as indicated by an arrow b3, whereby the assembly of the front subframe 42 is completed.

Figure 19:
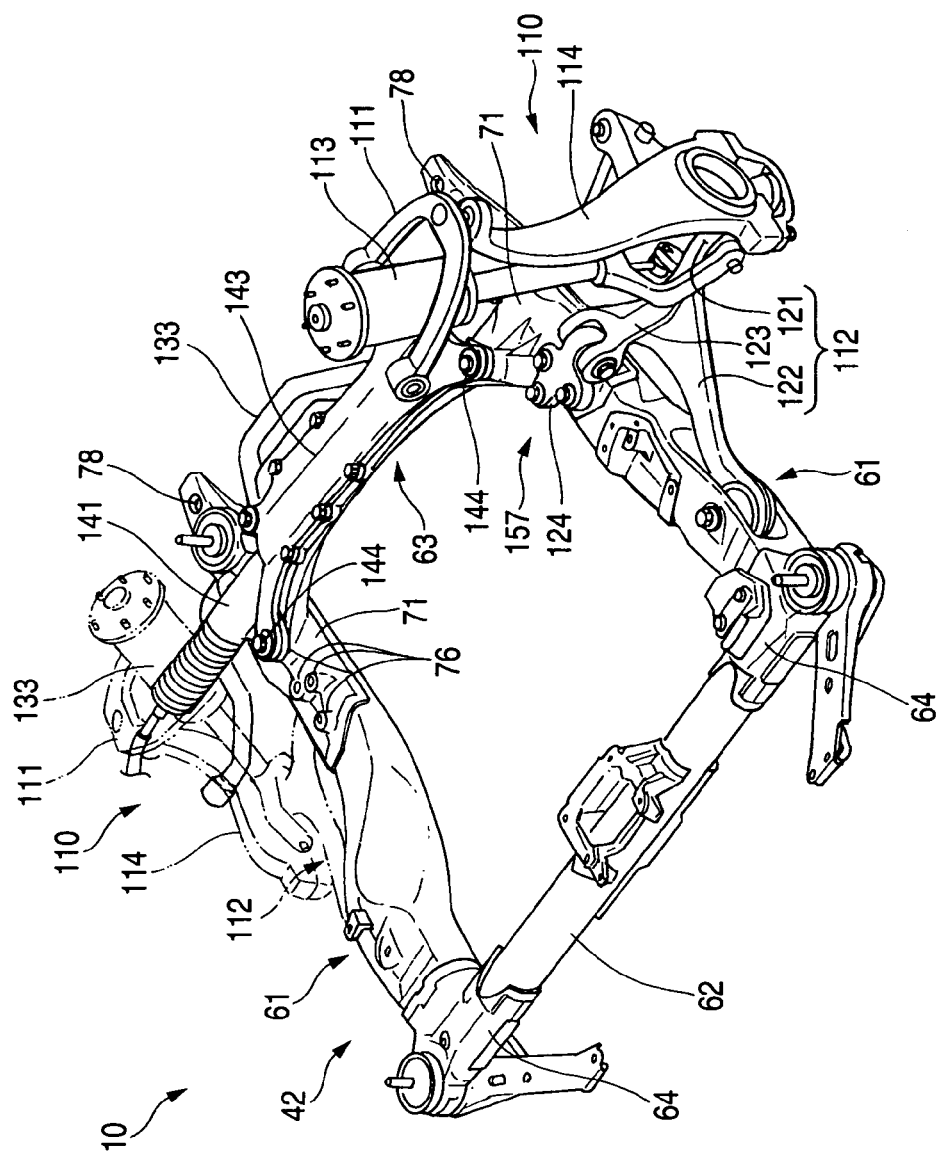
FIG. 19 is a perspective view showing a state in which a suspension, the steering gear box and the stabilizer are incorporated on the front subframe according to the invention.
Figure 20:
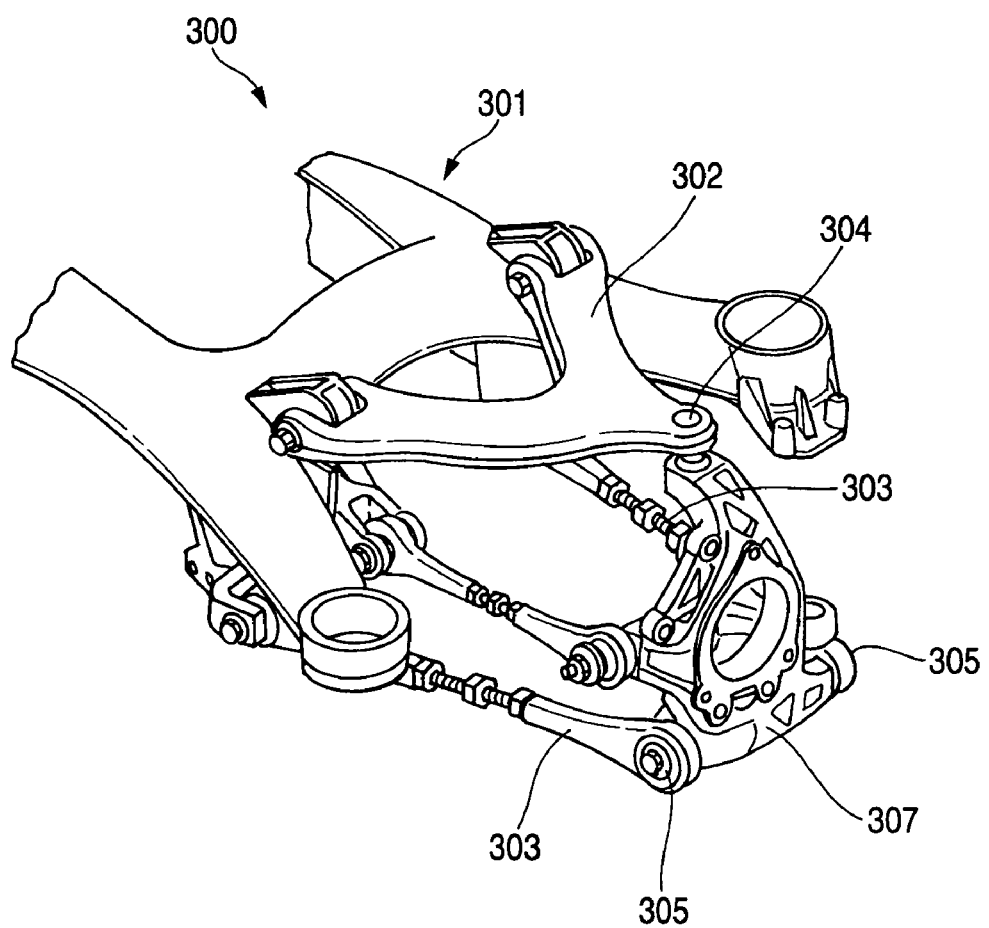
FIG. 20 is a drawing which explains a basic configuration of the body frame structure having a subframe that is made of a conventional aluminum die-cast.
Figure 21:
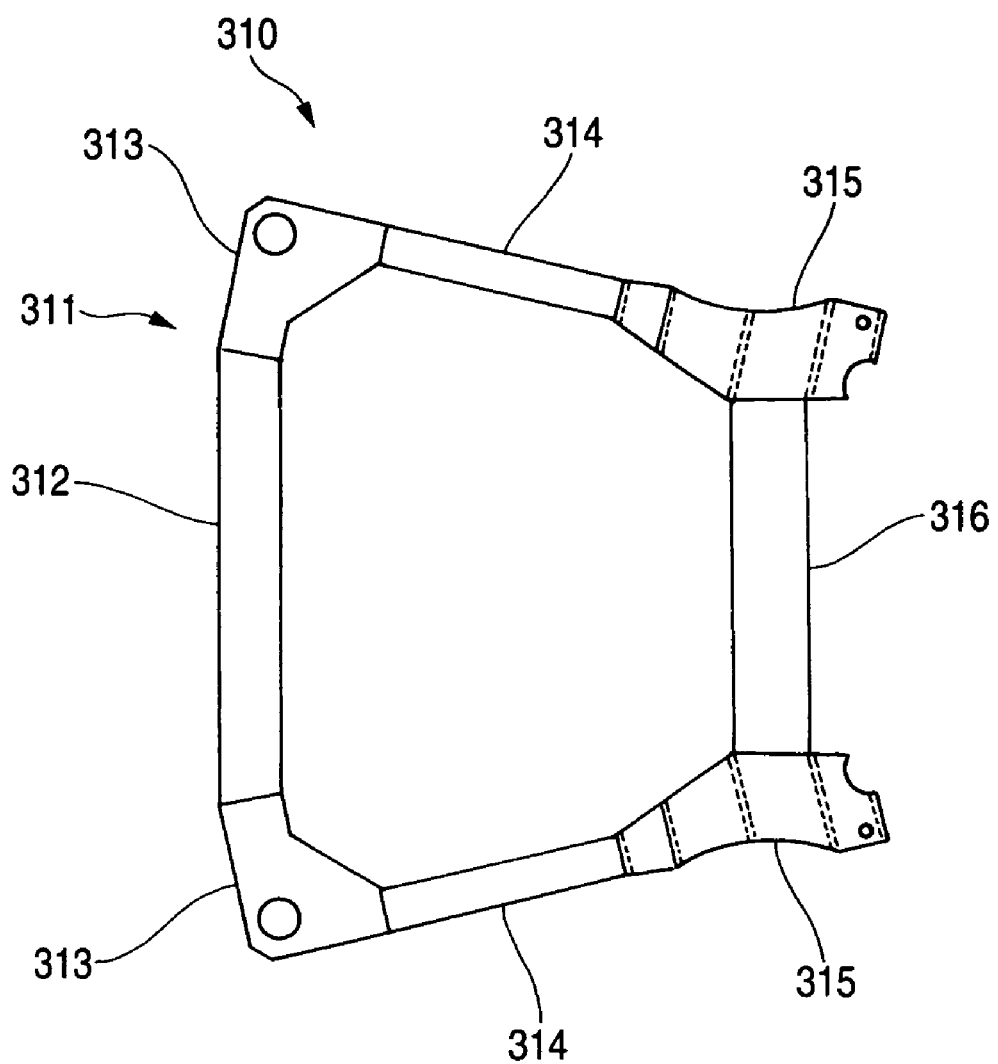
FIG. 21 is a drawing which explains a basic configuration of a conventional body frame structure having a subframe formed of an aluminum alloy extruded product.

FIG. 19 is a perspective view showing a state in which the suspension, the steering gear box and the stabilizer are installed on the front subframe of the body frame structure according to the invention.

In a body frame structure according to the invention which is such as to include the front subframe 42 that supports drive train parts including the power source (the engine) 43 (refer to FIG. 2), steering system parts including the steering gear box 141 and suspension system parts including the front suspension 110 and the camber angle adjusting mechanism (the adjusting mechanism) 157, and which is supported on the side of the body frame (the body) 20 shown in FIG. 1, the front subframe 42 is formed into a frame that is formed substantially into a shape of parallel crosses or into a rectangular shape by combing an aluminum alloy die-cast product with an aluminum alloy extruded material and is made up of the left and right primary connecting portions 64, 64 (hereinafter, described as left and right front joint portions 64, 64) and the left and right longitudinal submembers 71, 71 (hereinafter, described as left and right rear joint portions 71, 71) which are disposed at the corners of the frame that is formed substantially into the shape of parallel crosses or the rectangular shape, and the left and right longitudinal members 61, 61, the front cross member 62 and the rear cross member compound 63 which connect the joint portions 64, 64, 71, 71 together, and the connecting locations 76 . . . of the camber angle adjusting mechanism 157 are formed of a die-cast product. In addition, the body frame structure is such that the rear cross member compound 63 is formed of a die-cast product and the steering gear box 141 is supported on the rear cross member compound 63 so formed.

For example, it is preferable in case the rigidity can be increased without increasing the thickness of the sheets metal since the suppression of increase in weight can be realized.

To make this happen, the front subframe 42 is formed into the frame that is formed substantially into the shape of parallel crosses or into the rectangular shape by combing the aluminum alloy die-cast product with the aluminum alloy extruded material and is made up of the left and right front joint portions 64, 64 and the left and right rear joint portions 71, 71 which are disposed at the corners of the frame that is formed substantially into the shape of parallel crosses or the rectangular shape, and the left and right longitudinal members 61, 61, the front cross member 62 and the rear cross member compound 63 which connect the joint portions 64, 64, 71, 71 together, and the connecting locations 76 . . . of the camber angle adjusting mechanism 157 are formed of the die-cast product. In addition, the body frame structure is such that the rear cross member compound 63 is formed of the die-cast product.

Namely, by forming the front subframe 42 into the frame that is formed substantially into the shape of parallel crosses or into the rectangular shape by combing the aluminum alloy die-cast product with the aluminum alloy extruded material and, the connecting locations 76 . . . of the camber angle adjusting mechanism 157 are formed of the die-cast product, for example, the weight of the front subframe 42 can be reduced compared with a case where the rigidity of the frame is increased by increasing the thickness of the extruded material. As a result, the suppression of increase in weight can be suppressed while increasing the rigidity of the frame. Furthermore, the deformation of the connecting locations 76 . . . of the camber angle adjusting mechanism 157 can be reduced.

In addition, the die-cast product requires less mechanical work. Consequently, by forming the connecting locations 76 . . . of the camber angle adjusting mechanism 157 of the die-cast product, the attaching accuracy of the camber angle adjusting mechanism can be increased.

The body frame structure of the invention is such that the front suspension 110 is supported on the connecting locations 76 . . . of the camber angle adjusting mechanism 157 and the positioning holes (the positioning mechanism) 78, 78 which positions the front subframe 42 to the side of the body frame (the body) 20 shown in FIG. 1 are formed integrally in the connecting locations 76 . . . of the camber angle adjusting mechanism 157.

For example, it is preferable in case the assembling error can be eliminated since the accuracy of a location at which the dimensional accuracy is required.

Namely, the front suspension 110 is supported on the connecting locations 76 . . . of the camber angle adjusting mechanism (the adjusting mechanism) 157, and the positioning holes (the positioning mechanism) 78, 78 which positions the front subframe 42 to the side of the body frame (the body) 20 shown in FIG. 1 are formed integrally in the connecting locations 76 . . . of the camber angle adjusting mechanism 157, whereby the accuracy can be increased at which the front suspension 110 is attached to the body frame 20 side.

In addition, the rear cross member compound 63 is formed of the die-cast product and the steering gear box 141 is supported on the rear cross member compound 63 so formed, whereby the suppression of increase in weight can be realized while strongly and rigidly supporting the steering gear box 141.

As a result, not only can the vibration of the steering gear box 141 be prevented (the increase in steering rigidity can be realized) but also the increase in weight of the front subframe 42 can be suppressed.

In addition, the body frame structure according to the invention is such that the left and right rear joint portions 71, 71 and the rear cross member compound 63 are formed integrally of the die-cast product, the left and right front joint portions are formed of the die-cast product, and the front cross member 62 and the left and right longitudinal members 61, 61 are formed of the extruded material.

By forming the left and right rear joint portions 71, 71 and the rear cross member compound 63 integrally of the die-cast product, forming the left and right front joint portions of the die-cast product, and forming the front cross member 62 and the left and right longitudinal members 61, 61 of the extruded material, not only can the steering gear box 141 be supported strongly and rigidly but also, in the event that an excessive impact is inputted into the front subframe 42, the impact so inputted can be absorbed by the front cross member 62 and the left and right longitudinal members 61, 61 which are formed of the extruded material. As a result, the impact that is applied to the steering gear box can be suppressed to a minimum limit.

Note that while the body frame structure according to the invention is, as shown in FIG. 4, is the body frame structure including the front subframe 42, the invention is not limited thereto but may be applied to a rear subframe which supports the peripheral parts of a rear wheel.

As is explained based on FIG. 14, while the stabilizer 133 is fixed to the left rear joint portion and the left reinforcement member 65, and the right rear joint portion 71 and the right reinforcement member 65, the invention is not limited thereto but may be such that the stabilizer is fixed only to either a combination of the left rear joint portion and the left reinforcement member or a combination of the right rear joint portion and the right reinforcement member.

While the body frame structure according to the invention is such that the rear divided portions 61b, 61b of the left and right longitudinal members 61, 61, the left and right rear joint portions 71, 71 and the rear cross member 67 are formed integrally of the aluminum alloy die-cast product as shown in FIG. 13, the invention is not limited thereto but may be such that the left and right rear joint portions and the rear cross member are formed integrally of the die-cast product.

While the body frame structure according to the invention is such that the left and right rear joint portions 71, 71 are, as shown in FIG. 7, formed integrally with the rear cross member compound 63 using the aluminum alloy die-cast product, the invention is not limited thereto but may be such that part of the longitudinal members may be incorporated in the left and right rear joint portions. Namely, the left and right rear joint portions (the longitudinal submembers) 71, 71 may be such as to include the functions of the longitudinal members and the joint members.

While the adjusting mechanism of the body frame structure according to the invention is, as shown in FIG. 16, the camber angle adjusting mechanism, the invention is not limited thereto but may be such that the adjusting mechanism constitutes a caster angle adjusting mechanism for adjusting the caster angle.

While the invention has been described in detail and with reference to the specific embodiment, it is clear to those skilled in the art that various changes and modifications can be made thereto without departing from the spirit and scope of the invention.

This patent application is based on the Japanese Patent Application (No. 2004-103569) filed on Mar. 31, 2004, the Japanese Patent Application (No. 2004-103961) filed on Mar. 31, 2004 and the Japanese Patent Application (No. 2004-104177) filed on Mar. 31, 2004 and incorporates herein the contents of those Japanese Patent Applications by reference.

INDUSTRIAL APPLICABILITY

The body frame structure according to the invention is preferably applied to a vehicle such as a four-wheel drive vehicle which installs on a frame thereof drive train parts including a power supply, steering system parts including a steering and suspension system parts including a suspension.

The invention claimed is:

1. A body frame structure comprising:
a front subframe that supports drive train parts including a power supply, steering system parts including a steering gear box, suspension system parts including a front suspension or an adjusting mechanism for adjusting a caster angle, and a car body,
wherein the front subframe is formed substantially into a shape of parallel crosses or into a rectangular shape and which comprises:
a front cross member,
left and right front joint portions which are connected to left and right end portions of the front cross member,
a left longitudinal member that extends rearwards from the left front joint portion,
a right longitudinal member that extends rearwards from the right front joint portion,
left and right rear joint portions which connect to distal ends of the left and right longitudinal members, respectively, and
a rear cross member that connects to the left and right rear joint portions, wherein the left and right front rear joint portions are made of an aluminum alloy die-cast product, and wherein the steering gear box is supported on the rear cross member,
the left and right rear joint portions and the rear cross member are formed integrally of an aluminum alloy die-cast product, and
the left and right longitudinal members are made of an aluminum alloy wrought product, and wherein the left and right front joint portions, and the left and right rear joint portions define car body support portions where the front subframe supports the car body.

2. A body frame structure as set forth in claim 1, wherein the left and right longitudinal members are divided into left and right front divided portions and left and right rear divided portions and the left and right rear divided portions are made integrally of an aluminum alloy die-cast product, and in that a left reinforcement member that is formed of an aluminum alloy wrought product is extended from the left front divided portion to the left rear joint portion so that the left reinforcement member is fixed to the left rear divided portion and the left rear joint portion, while a right reinforcement member that is formed of an aluminum alloy wrought product is extended from the right front divided portion to the right rear joint portion so that the right reinforcement member is fixed to the right rear divided portion and the right rear joint portion.

3. A body frame structure as set forth in claim 1 or 2, further comprising a stabilizer adapted to suppress the inclination of the car body and which is fixed to the left rear joint portion and the left reinforcement member and/or the right rear joint portion and the right reinforcement member, wherein the stabilizer straddles the die-cast product and the wrought product.

4. A body frame structure as set forth in claim 1, wherein the front cross member and the left and right longitudinal members are formed of an aluminum alloy extruded product.

5. A body frame structure as set forth in claim 1 characterized in that a location to which the adjusting mechanism is joined is formed of an aluminum alloy die-cast product.

6. A body frame structure as set forth in claim 5, characterized in that the front suspension is supported at the location to which the adjusting mechanism is joined, and a positioning mechanism adapted to position the front subframe on the body side is formed integrally with the location to which the adjusting mechanism is joined.

7. A body frame structure comprising:
a front subframe that supports drive train parts including a power source, steering system parts including a steering gear box, and suspension system parts including a front suspension, and a car body,
wherein the front subframe is formed substantially into a shape of parallel crosses or into a rectangular shape and which comprises:
a front cross member,
left and right front joint portions which are connected to left and right end portions of the front cross member,
a left longitudinal member that extends rearwards from the left front joint portion,
a right longitudinal member that extends rearwards from the right front joint portion,
left and right rear joint portions which connect to distal ends of the left and right longitudinal members, respectively, and
a rear cross member that connects to the left and right rear joint portions,
wherein the left and right rear joint portions and the rear cross member are formed integrally of an aluminum alloy die-cast product, the steering gear box is supported on the rear cross member, and the left and right front joint portions, and the left and right rear joint portions define car body support portions where the front subframe supports the car body.

8. A body frame structure as set forth in claim 7, wherein the left and right front joint portions are formed of an aluminum alloy die-cast product, and the front cross member and the left and right longitudinal members are formed of an aluminum alloy extruded product.

9. A body frame structure comprising:
a front subframe that supports drive train parts including a power supply, steering system parts including a steering gear box, suspension system parts including a front suspension, an adjusting mechanism for adjusting a camber angle or caster angle, and a car body,
wherein the front subframe is formed substantially into a shape of parallel crosses or into a rectangular shape and which comprises:
a front cross member,
left and right front joint portions which are connected to left and right end portions of the front cross member,
a left longitudinal member that extends rearwards from the left front joint portion,
a right longitudinal member that extends rearwards from the right front joint portion,
left and right rear joint portions which connect to distal ends of the left and right longitudinal members, respectively, and
a rear cross member that connects to the left and right rear joint portions, wherein the steering gear box is fixed to the rear cross member, the adjusting member is disposed on the rear cross member at a location that is formed of an aluminum alloy die-cast product, and the left and right front joint portions and the left and right rear joint portions define car body support portions where the front subframe supports the car body.

10. A body frame structure as set forth in claim 9, wherein the front suspension is supported at a location to which the adjusting mechanism is joined, and a positioning mechanism adapted to position the front subframe relative to the car body is formed integrally with the location to which the adjusting mechanism is joined.

* * * * *